(12) United States Patent  
Kim et al.

(10) Patent No.: US 11,568,553 B2  
(45) Date of Patent: Jan. 31, 2023

(54) CAMERA MODULE AND DEPTH MAP EXTRACTION METHOD THEREOF

(71) Applicant: LG INNOTEK CO., LTD., Seoul (KR)

(72) Inventors: Eun Song Kim, Seoul (KR); Woong Lee, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 122 days.

(21) Appl. No.: 17/047,268

(22) PCT Filed: Apr. 12, 2019

(86) PCT No.: PCT/KR2019/004416  
§ 371 (c)(1),  
(2) Date: Oct. 13, 2020

(87) PCT Pub. No.: WO2019/199101  
PCT Pub. Date: Oct. 17, 2019

(65) Prior Publication Data  
US 2021/0166408 A1    Jun. 3, 2021

(30) Foreign Application Priority Data  
Apr. 13, 2018  (KR) .................... 10-2018-0043431

(51) Int. Cl.  
*G06T 7/55* (2017.01)  
*H04N 13/254* (2018.01)  
(Continued)

(52) U.S. Cl.  
CPC ............... *G06T 7/55* (2017.01); *G01B 11/22* (2013.01); *G02B 5/208* (2013.01); *G02B 7/006* (2013.01);  
(Continued)

(58) Field of Classification Search  
CPC ...... G06T 7/55; H04N 13/254; H04N 5/2254; G01B 11/22; G02B 5/208; G02B 7/006  
(Continued)

(56) References Cited

U.S. PATENT DOCUMENTS

| | | | |
|---|---|---|---|
| 2008/0135728 A1* | 6/2008 | Yang | H04N 5/2254 |
| | | | 250/208.1 |
| 2011/0188028 A1 | 8/2011 | Hui et al. | |
| 2014/0184809 A1* | 7/2014 | Luan | H04N 5/2257 |
| | | | 348/164 |

FOREIGN PATENT DOCUMENTS

| | | |
|---|---|---|
| EP | 0 689 349 A1 | 12/1995 |
| JP | 9-74524 A | 3/1997 |

(Continued)

OTHER PUBLICATIONS

KR20140028536 Machine Translation (Year: 2014).*

(Continued)

*Primary Examiner* — Nguyen T Truong  
(74) *Attorney, Agent, or Firm* — Saliwanchik, Lloyd & Eisenschenk

(57) ABSTRACT

A camera module according to one embodiment of the present invention comprises: an illumination unit for outputting a signal of incident light irradiated to an object; a lens unit for collecting a signal of reflection light reflected from the object, an image sensor unit for generating an electric signal from a reflection light signal collected by the lens unit, a tilting unit for shifting an optical path of the reflection light signal, and an image control unit for extracting a depth map of the object by using a phase difference between the incident light signal with respect to a frame having shifted by the tilting unit and the reflection light signal received by the image sensor unit, wherein the lens unit is disposed on the image sensor unit and includes an infrared (IR) filter disposed on the image sensor unit and at (Continued)

least one lens disposed on the infrared filter, and the tilting unit controls tilt of the infrared filter.

20 Claims, 18 Drawing Sheets

(51) Int. Cl.
 *G01B 11/22* (2006.01)
 *G02B 5/20* (2006.01)
 *G02B 7/00* (2021.01)
 *H04N 5/225* (2006.01)
 *H04N 13/00* (2018.01)
(52) U.S. Cl.
 CPC ......... *H04N 5/2254* (2013.01); *H04N 13/254* (2018.05); *H04N 5/2252* (2013.01); *H04N 2013/0081* (2013.01)
(58) Field of Classification Search
 USPC .......................................................... 348/46
 See application file for complete search history.

(56) References Cited

FOREIGN PATENT DOCUMENTS

| | | |
|---|---|---|
| JP | H11-187309 A | 7/1999 |
| KR | 10-2014-0028536 A | 3/2014 |
| KR | 10-2016-0142156 A | 12/2016 |
| KR | 10-2017-0130594 A | 11/2017 |
| KR | 10-1804779 B1 | 12/2017 |

OTHER PUBLICATIONS

JPH11187309 Machine Translation (Year: 1999).*
International Search Report in International Application No. PCT/KR2019/004416, filed Apr. 12, 2019.
Supplementary European Search Report dated Jul. 30, 2021 in European Application No. 19784499.6.
Supplementary European Search Report dated Apr. 15, 2021 in European Application No. 19784499.6.

* cited by examiner

1000 ; 1110, 1120, 1130, 1210, 1220

CAMERA MODULE AND DEPTH MAP EXTRACTION METHOD THEREOF

CROSS-REFERENCE TO RELATED APPLICATIONS

This application is the U.S. national stage application of International Patent Application No. PCT/KR2019/004416, filed Apr. 12, 2019, which claims the benefit under 35 U.S.C. § 119 of Korean Application No. 10-2018-0043431, filed Apr. 13, 2018, the disclosures of each of which are incorporated herein by reference in their entirety.

TECHNICAL FIELD

The present invention relates to a camera module and a depth map extraction method thereof.

BACKGROUND ART

Three-dimensional (3D) content is applied not only to games and culture but also to many fields such as education, manufacturing, and autonomous driving, and a depth map is required to acquire 3D content. The depth map is information indicating a distance in space and represents perspective information of one point with respect to another point of a two-dimensional (2D) image.

One method of acquiring a depth map includes projecting an infrared (IR) structured light onto an object, interpreting light reflected from the object, and extracting a depth map. The IR structured light scheme has a problem in that it is difficult to obtain a desired level of depth resolution for a moving object.

Meanwhile, a time-of-flight (ToF) scheme has attracted attention as a technology that replaces the IR structured light scheme.

According to the ToF scheme, the distance to an object is calculated by measuring a flight time, that is, a time for light to be shot, reflected, and return. The greatest advantage of the ToF scheme is that it quickly provides distance information regarding 3D space in real time. Also, a user can obtain accurate distance information without separate algorithm application or hardware correction. Also, a user can acquire an accurate depth map even if he or she measures a very close subject or a moving subject.

However, the current ToF scheme has a problem in that information obtainable per frame, i.e., resolution, is low.

One way to increase resolution is to increase the number of pixels of an image sensor. However, in this case, there is a problem in that the volume and production cost of a camera module increase significantly.

Accordingly, there is a need for a depth map acquisition method capable of increasing resolution without significantly increasing the volume and production cost of a camera module.

DISCLOSURE

Technical Problem

An object of the present invention is to provide a camera module for extracting a depth map using a time-of-flight (ToF) scheme and a depth map extraction method thereof.

Technical Solution

According to an embodiment of the present invention, there is provided a camera module including a lighting unit configured to output an incident light signal to be emitted to an object, a lens unit configured to collect a reflected light signal reflected from the object, an image sensor unit configured to generate an electric signal from the reflected light signal collected by the lens unit, a tilting unit configured to shift an optical path of the reflected light signal, and an image control unit configured to extract a depth map of the object from a frame shifted by the tilting unit using a phase difference between the incident light signal and the reflected light signal received by the image sensor unit, wherein the lens unit is disposed on the image sensor unit, the lens unit comprises an infrared (IR) filter disposed on the image sensor unit and at least one lens disposed on the IR filter, and the tilting unit controls a slope of the IR filter.

The tilting unit may include a voice coil motor (VCM), and the IR filter may be disposed between the image sensor unit and the VCM.

The VCM may include a magnet holder, a plurality of magnets disposed on the magnet holder and spaced apart from one another at predetermined intervals, a coil holder, and a plurality of coils disposed on the coil holder and spaced apart from one another at predetermined intervals to make pairs with the plurality of magnets.

The IR filter may include a glass layer and a glass layer holder configured to support the glass layer, and at least a portion of the glass layer holder may be surrounded by the magnet holder.

The magnet holder may include a plurality of magnet guides for accommodating the plurality of magnets, the glass layer holder may include a plurality of protrusions corresponding to the plurality of magnet guides, and the plurality of protrusions may be moved to be brought into contact with or spaced apart from the plurality of magnet guides according to a magnetic field generated between the plurality of coils and the plurality of magnets.

The glass layer may be tilted to a predetermined angle according to movement of the plurality of protrusions.

The glass layer may be an IR pass glass layer.

The IR filter may further include an IR pass glass layer disposed on the image sensor unit and spaced apart from the glass layer.

The camera module may further include an elastic film disposed between the image sensor and the IR filter.

The camera module may further include a housing configured to accommodate the image sensor, and the elastic film may be adhered to the housing.

According to another embodiment of the present invention, there is provided a camera module including a lighting unit configured to output an incident light signal to be emitted to an object, a lens unit configured to collect a reflected light signal reflected from the object, an image sensor unit configured to generate an electric signal from the reflected light signal collected by the lens unit, an elastic film disposed on the image sensor unit, a tilting unit configured to shift an optical path of the reflected light signal, and an image control unit configured to extract a depth map of the object from a frame shifted by the tilting unit using a phase difference between the incident light signal and the reflected light signal received by the sensor unit, wherein the tilting unit controls a shape of the elastic film.

The camera module may further include a housing configured to accommodate the image sensor, and one face of the elastic film may be coupled to the housing, and the other face of the elastic film may be coupled to the tilting unit.

Advantageous Effects

With the camera module according to an embodiment of the present invention, it is possible to acquire a depth map with high resolution without significantly increasing the number of pixels of an image sensor.

Also, according to an embodiment, it is possible to obtain a subpixel shift effect using a simple structure, and also it is possible to protect an image sensor from moisture, foreign matter, and the like.

MODE FOR CARRYING OUT THE INVENTION

Figure 1:
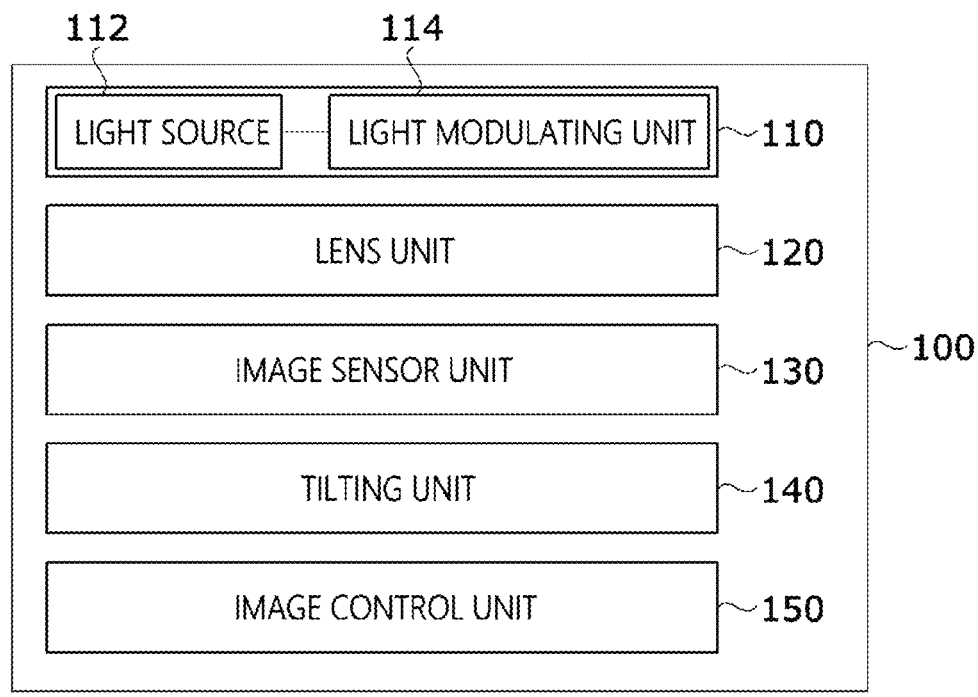
FIG. 1 is a block diagram of a time-of-flight (ToF) camera module according to an embodiment of the present invention.

While the invention is susceptible to various modifications and may have several embodiments, specific embodiments thereof are shown by way of example in the drawings and will be described herein. It should be understood, however, that there is no intent to limit the invention to the particular forms disclosed, but on the contrary, the invention is to cover all modifications, equivalents, and alternatives falling within the spirit and scope of the invention.

Although the terms "first," "second," etc. may be used herein to describe various elements, these elements should not be limited by these terms. These terms are only used to distinguish one element from another. For example, a first element may be called a second element, and a second element may also be called a first element without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a," "an," and "one" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments will be described in detail with reference to the accompanying drawings. The same reference numerals are given to the same or equivalent elements throughout the drawings and redundant descriptions thereof will be omitted.

FIG. 1 is a block diagram of a ToF camera module according to an embodiment of the present invention.

Referring to FIG. 1, the ToF camera module 100 includes a lighting unit 110, a lens unit 120, an image sensor unit 130, a tilting unit 140, and an image control unit 150.

The lighting unit 110 generates an incident light signal and emits the generated incident light signal to an object. In this case, the lighting unit 110 may generate and output an incident light signal in the form of a pulse wave or a continuous wave. The continuous wave may be a sinusoidal wave or a squared wave. By generating an incident light signal in the form of a pulse wave or a continuous wave, the ToF camera module 100 may detect a phase difference between an incident light signal output from the lighting unit 110 and a reflected light signal reflected from an object. Herein, incident light may refer to light that is output from the lighting unit 110 and incident on an object, and reflected light may refer to light that is output from the lighting unit 110 and then reflected from an object after reaching the object. From the position of the ToF camera module 100, the incident light may be output light, and the reflected light may be incident light.

The lighting unit 110 may emit the generated incident light signal to the object during a predetermined integration time. Here, the integration time refers to one frame period. When a plurality of frames are generated, the predetermined integration time is repeated. For example, when the ToF camera module 100 captures the object at 20 fps, the integration time is 1/20 sec. Also, when 100 frames are generated, the integration time may be repeated 100 times.

The lighting unit 110 may generate a plurality of incident light signals having different frequencies. The lighting unit 110 may sequentially and repeatedly generate a plurality of incident light signals having different frequencies. Alternatively, the lighting unit 110 may generate a plurality of incident light signals having different frequencies at the same time.

Figure 2:
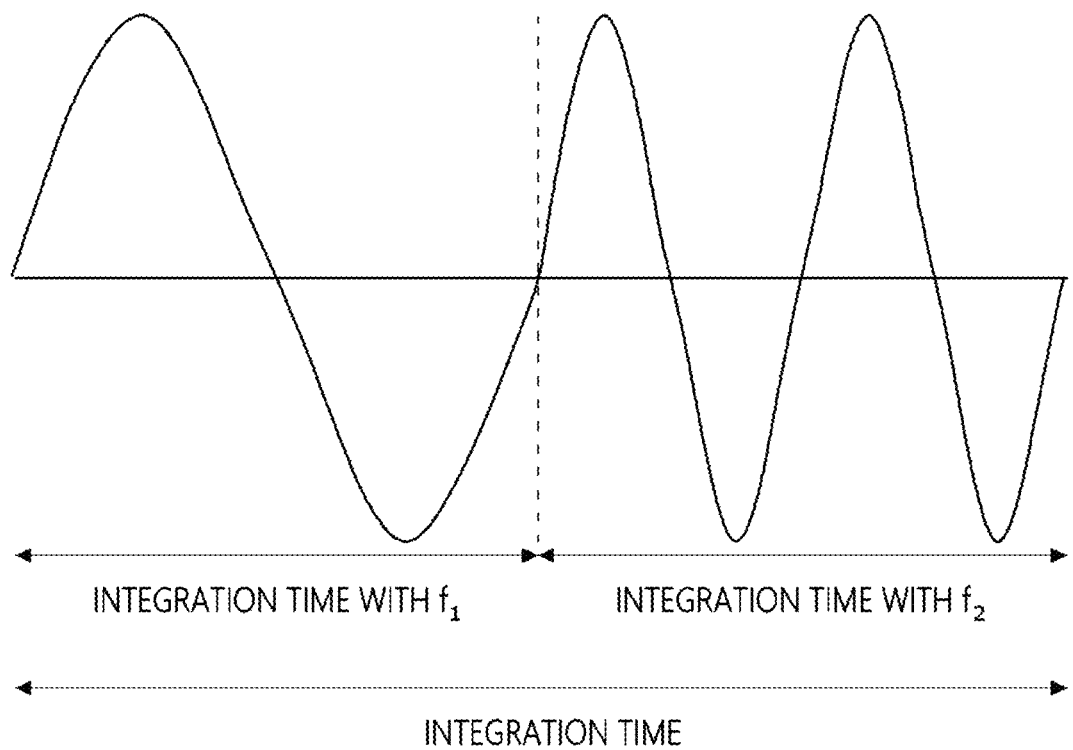
FIG. 2 is a diagram illustrating a frequency of an incident light signal.

FIG. 2 is a diagram illustrating a frequency of an incident light signal. According to an embodiment of the present invention, the lighting unit 110 may control the first half of the integration time to generate an incident light signal having a frequency $f_1$ and may control the other half of the integration time to generate an incident light signal having a frequency $f_2$.

According to another embodiment, the lighting unit 110 may control some of a plurality of light-emitting diodes to generate an incident light signal having a frequency $f_1$ and may control the other light-emitting diodes to generate an incident light signal having a frequency $f_2$.

To this end, the lighting unit 110 may include a light source 112 configured to generate light and a light modulating unit 114 configured to modulate light.

First, the light source 112 generates light. The light generated by the light source 112 may be infrared light having a wavelength of 770 nm to 3000 nm or may be visible light having a wavelength of 380 to 770 nm. The light source 112 may use a light-emitting diode (LED) and may have a plurality of LEDs arranged in a certain pattern. In addition, the light source 112 may include an organic light-emitting diode (OLED) or a laser diode (LD).

The light source 112 is repeatedly turned on and off at predetermined time intervals to generate an incident light signal in the form of a pulse wave or a continuous wave. A predetermined time interval may be the frequency of the incident light signal. The turning-on and off of the light source may be controlled by the light modulating unit 114.

The light modulating unit 114 controls the turning-on and off of the light source 112 to control the light source 112 to generate an incident light signal in the form of a continuous wave or a pulse wave. The light modulating unit 114 may control the light source 112 to generate an incident light signal in the form of a continuous wave or a pulse wave through frequency modulation or pulse modulation.

Meanwhile, the lens unit 120 collects a reflected light signal reflected from the object and forwards the reflected light signal to the image sensor unit 130.

Figure 3:
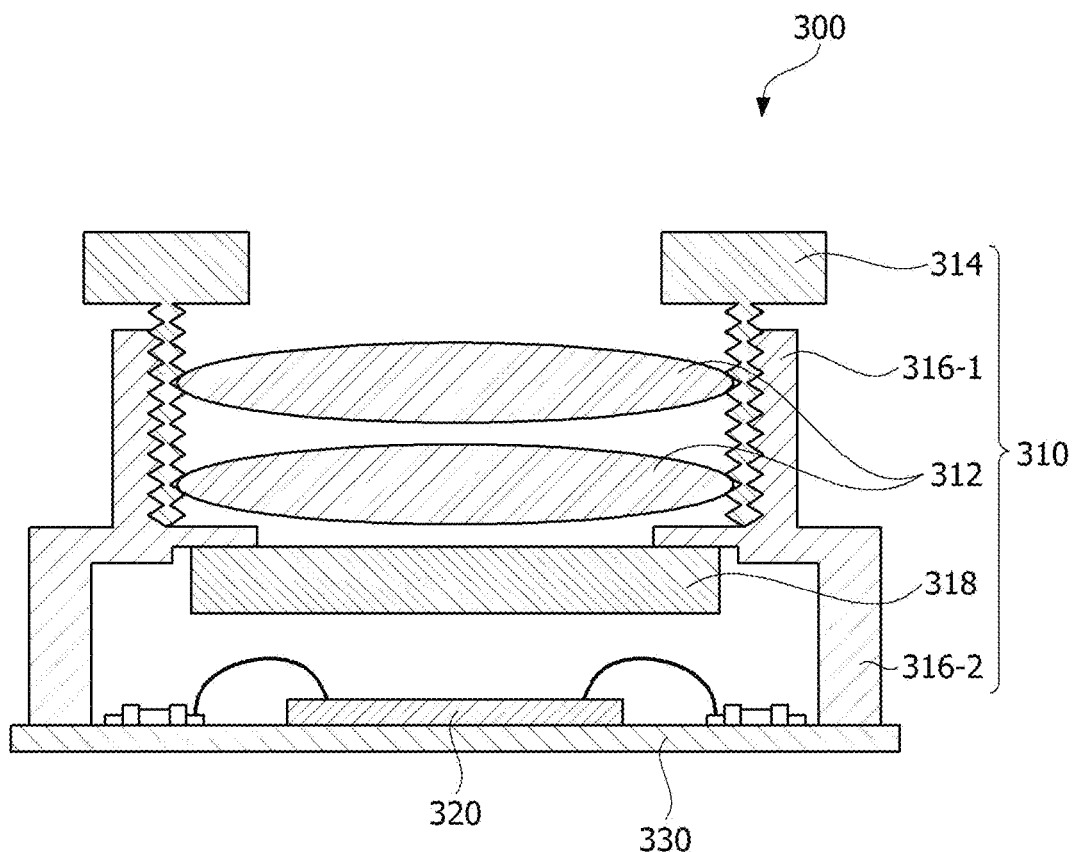
FIG. 3 is an example cross-sectional view of a camera module.

FIG. 3 is an example cross-sectional view of a camera module.

Referring to FIG. 3, the camera module 300 includes a lens assembly 310, an image sensor 320, and a printed circuit board 330. Here, the lens assembly 310 may correspond to the lens unit 120 of FIG. 1, and the image sensor 320 may correspond to the image sensor unit 130 of FIG. 1. Also, the image control unit 150 and the like of FIG. 1 may be implemented in the printed circuit board 330. Although not shown, the lighting unit 110 of FIG. 1 may be disposed on the side of the image sensor 320 on the printed circuit board 330 or may be disposed outside the camera module 300.

The lens assembly 310 may include a lens 312, a lens barrel 314, a lens holder 316, and an IR filter 318.

The lens 312 may include a plurality of lens and may include one lens. When the lens 312 includes a plurality of lens, the lens may be arranged with respect to a central axis to form an optical system. Here, the central axis may be the same as an optical axis of the optical system.

The lens barrel 314 is coupled to the lens holder 316 to provide a space for accommodating lens. The lens barrel 314 may be rotatably coupled to one or a plurality of lenses, but this is just an example. Therefore, the lens barrel 314 and the lenses may be coupled in another way, such as a scheme using an adhesive (e.g., an adhesive resin such as epoxy).

The lens holder 316 may be coupled to the lens barrel 314 to support the lens barrel 314 and may be coupled to the printed circuit board 330 equipped with the image sensor 320. The lens holder 316 may form a space for attachment of the IR filter 318 under the lens barrel 314. A helical pattern may be formed on an inner circumferential surface of the lens holder 316, and similarly, a helical pattern may be formed on an outer circumferential surface of the lens barrel 314. Thus, the lens holder 316 and the lens barrel 314 may be rotatably coupled to each other. However, this is just an example, and the lens holder 316 and the lens barrel 314 may be coupled to each other through an adhesive or may be integrally formed.

The lens holder 316 may include an upper holder 316-1 to be coupled to the lens barrel 314 and a lower holder 316-2 to be coupled to the printed circuit board 330 equipped with the image sensor 320. The upper holder 316-1 and the lower holder 316-2 may be formed integrally with each other, may be separated but can be engaged with or coupled to each other, or may be separated and spaced apart from each other. In this case, the upper holder 316-1 may have a smaller diameter than the lower holder 316-2.

The above example is just an embodiment, and the lens unit 120 may be configured in another structure capable of collecting a reflected light signal incident on the ToF camera module 100 and forwarding the reflected light signal to the image sensor unit 130.

Referring to FIG. 1 again, the image sensor unit 130 generates an electric signal using the reflected light signal collected through the lens unit 120.

The image sensor unit 130 may be synchronized with the turning-on and off period of the lighting unit 110 to absorb the reflected light signal. In detail, the image sensor unit 130 may absorb the light in phase or out of phase with the incident light signal output from the lighting unit 110. That is, the image sensor unit 130 may repeatedly perform a step of absorbing a reflected light signal while the light source is turned on and a step of absorbing a reflected light signal while the light source is turned off.

Subsequently, the image sensor unit 130 may use a plurality of reference signals with different phase differences to generate an electric signal corresponding to each reference signal. The frequency of the reference signal may be set to be the same as the frequency of the incident light signal output from the lighting unit 110. Accordingly, when the lighting unit 110 generates incident light signals using a plurality of frequencies, the image sensor unit 130 generates electric signals using a plurality of reference signals corresponding to the frequencies. The electric signals may include information regarding electric charge quantities or voltages corresponding to the reference signals.

Figure 4:
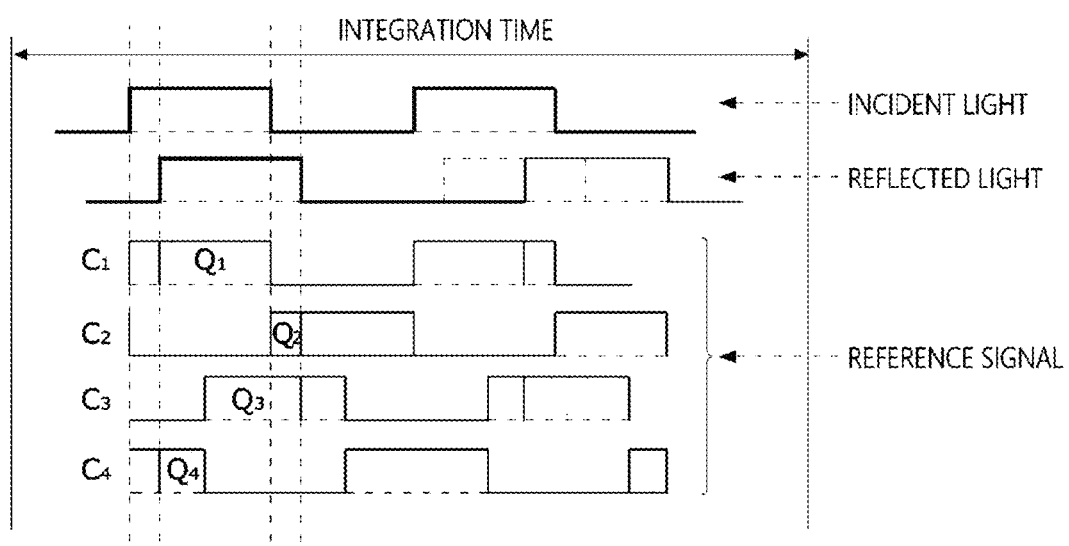
FIG. 4 is a diagram illustrating an electric signal generation process according to an embodiment of the present invention.

FIG. 4 is a diagram illustrating an electric signal generation process according to an embodiment of the present invention.

As shown in FIG. 4, the reference signal according to an embodiment of the present invention may include four reference signals $C_1$ to $C_4$. The reference signals $C_1$ to $C_4$ may have the same frequency as the incident light signal and have a phase difference of 90 degrees from one another. The reference signal $C_1$, which is one of the four reference signals, may have the same phase as the incident light signal.

A reflected light signal has a phase delayed by a distance traveled by an incident light signal incident on and returned from an object. The image sensor unit 130 mixes the reflected light signal with each of the reference signals. Thus, the image sensor unit 130 may generate an electric signal corresponding to a shaded portion of FIG. 4 for each reference signal.

In another embodiment, when incident light signals are generated using a plurality of frequencies during an integration time, the image sensor unit 130 absorbs reflected light signals corresponding to the plurality of frequencies. For example, it is assumed that incident light signals having frequencies $f_1$ and $f_2$ are generated, and the plurality of reference signals have a phase difference of 90 degrees from one another. In this case, reflected light signals also have frequencies $f_1$ and $f_2$. Thus, four electric signals may be generated using the reflected light signal with the frequency $f_1$ and corresponding four reference signals. Also, four electric signals may be generated using the reflected light signal with the frequency $f_2$ and corresponding four reference signals. Accordingly, a total of eight electric signals may be generated.

The image sensor unit 130 may be configured in a structure in which a plurality of pixels are arranged in a grid form. The image sensor unit 130 may be a complementary metal oxide semiconductor (CMOS) image sensor or a charged coupled device (CCD) image sensor. Also, the image sensor unit 130 may include a ToF sensor configured to receive infrared light reflected from a subject and measure a distance from the subject using a traveled time or a phase difference.

Figure 5:
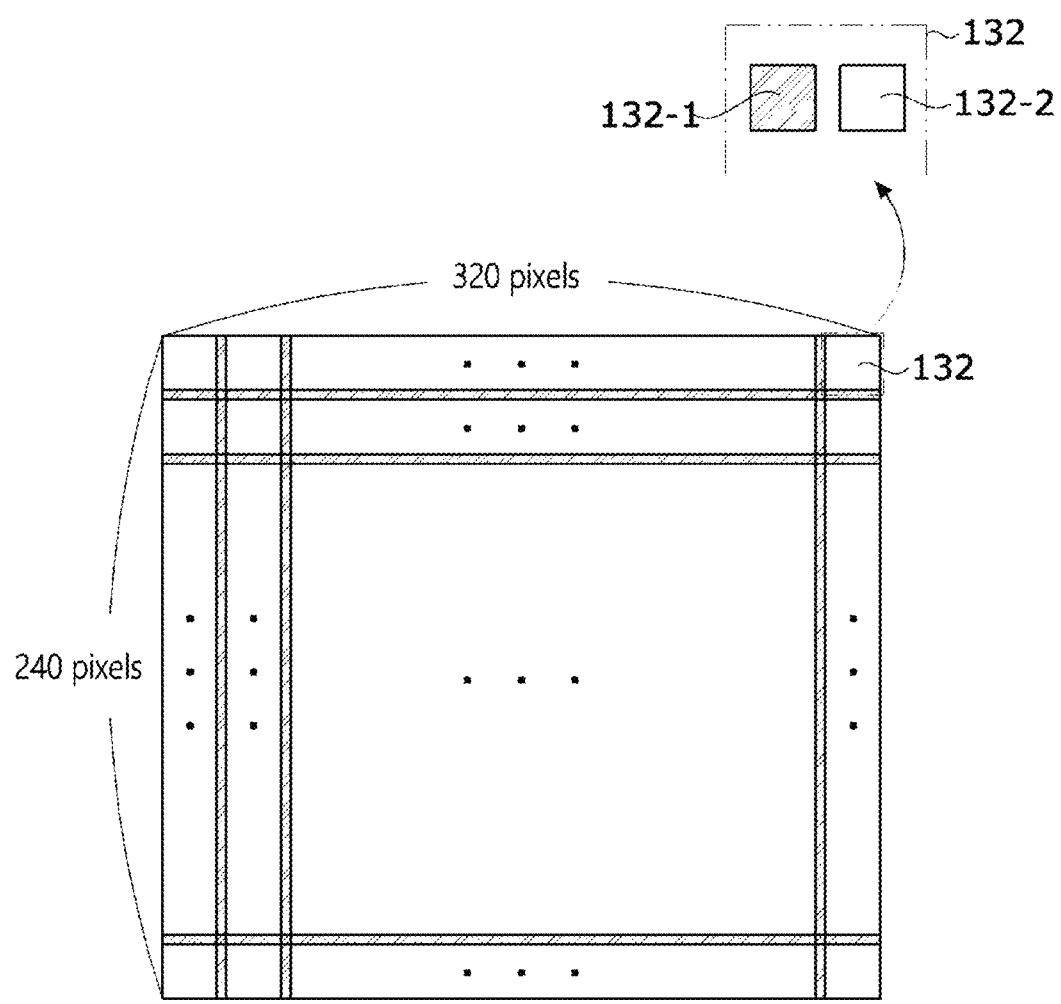
FIG. 5 is a diagram illustrating an image sensor 130 according to an embodiment of the present invention.

FIG. 5 is a diagram illustrating an image sensor 130 according to an embodiment of the present invention. For example, for an image sensor 130 with a resolution of 320×240 as shown in FIG. 5, 76,800 pixels are arranged in a grid form. In this case, a predetermined interval, such as a shaded portion of FIG. 5, may be formed between the plurality of pixels. In an embodiment of the present invention, one pixel refers to a pixel and a predetermined interval adjacent to the pixel.

According to an embodiment of the present invention, each pixel 132 may include a first light receiving unit 132-1 including a first photodiode and a first transistor and a second light receiving unit 132-2 including a second photodiode and a second transistor.

The first light receiving unit 132-1 receives a reflected light signal in the same phase as the waveform of the incident light. That is, while the light source is turned on, the first photodiode is turned on to absorb a reflected light signal. Also, while the light source is turned off, the first photodiode is turned off to stop absorbing a reflected light signal. The first photodiode converts the absorbed reflected light signal into an electric current and forwards the electric current to the first transistor. The first transistor converts the forwarded electric current into an electric signal and outputs the electric signal.

The second light receiving unit 132-2 receives a reflected light signal in the opposite phase to the waveform of the incident light. That is, while the light source is turned on, the second photodiode is turned off to absorb a reflected light signal. Also, while the light source is turned off, the second photodiode is turned on to stop absorbing a reflected light signal. The second photodiode converts the absorbed reflected light signal into an electric current and forwards the electric current to the second transistor. The second transistor converts the forwarded electric current into an electric signal.

Thus, the first light receiving unit 132-1 may be referred to as an in-phase receiving unit, and the second light receiving unit 132-2 may be referred to as an out-of-phase receiving unit. When, as described above, the first receiving unit 132-1 and the second light receiving unit 132-2 are activated with a time difference, the amount of light received may vary depending on the distance to the object. For example, when the object is in front of the ToF camera module 100 (i.e., the distance is equal to zero), the time it takes for light to be reflected from the object after the light is output from the lighting unit 110 is zero, and thus the turning-on and off period of the light source becomes a light receiving period with no changes. Accordingly, only the first light receiving unit 132-1 can receive light, and the second light receiving unit 132-2 cannot receive light. As another example, when the object is located a predetermined distance away from the ToF camera module 100, it takes time for light to be reflected from the object after the light is output from the lighting unit 110, and thus the turning-on and off period of the light source becomes different from a light receiving period. Accordingly, the amount of light received by the first light receiving unit 132-1 becomes different from that of the second light receiving unit 132-2. That is, the distance to the object may be calculated using the difference between the amount of light input to the first light receiving unit 132-1 and the amount of light input to the second light receiving unit 132-2. Referring to FIG. 1 again, the image control unit 150 calculates a phase difference between incident light and reflected light using an electric signal received from the image sensor unit 130 and calculates a distance between the object and the ToF camera module 100 using the phase difference.

In detail, the image control unit 150 may calculate a phase difference between incident light and reflected light using information regarding electric charge quantity of the electric signal.

As described above, four electric signals may be generated for each frequency of the incident light signal. Therefore, the image control unit 150 may compute a phase difference $t_d$ between the incident light signal and the reflected light signal using Equation 1 below:

$$t_d = \arctan\left(\frac{Q_3 - Q_4}{Q_1 - Q_2}\right) \quad \text{Equation 1}$$

where $Q_1$ to $Q_4$ are electric charge quantities of four electric signals. $Q_1$ is an electric charge quantity of an electric signal corresponding to a reference signal having the same phase as the incident light signal. $Q_2$ is an electric charge quantity of an electric signal corresponding to a reference signal having a phase lagging by 180 degrees from the incident light signal. $Q_3$ is an electric charge quantity of an electric signal corresponding to a reference signal having a phase lagging by 90 degrees from the incident light signal. $Q_4$ is an electric charge quantity of an electric signal corresponding to a reference signal having a phase lagging by 270 degrees from the incident light signal.

Thus, the image control unit 150 may calculate a distance between the object and the ToF camera module 100 using the phase difference between the incident light signal and the reflected light signal. In this case, the image control unit 150 may compute a distance d between the object and the ToF camera module 100 using Equation 2 below:

$$d = \frac{c}{2f} \frac{t_d}{2\pi} \qquad \text{Equation 2}$$

where c is the speed of light, and f is the frequency of incident light.

Meanwhile, in an embodiment of the present invention, a super resolution (SR) technique is used to increase the resolution of a depth map. The SR technique is a technique for obtaining a high-resolution image from a plurality of low-resolution images, and a mathematical model of the SR technique may be expressed using Equation 3 below:

$$y_k = D_k B_k M_k x + n_k \qquad \text{Equation 3}$$

where $1 \leq k \leq p$, p is the number of low-resolution images, $y_k$ is a low-resolution image ($=y_{k,1}, y_{k,2}, \ldots, y_{k,M}^T$; here, $M=N_1*N_2$), $D_k$ is a down sampling matrix, $B_k$ is an optical blur matrix, $M_k$ is an image warping matrix, x is a high-resolution image ($=x_1, x_2, \ldots, x_N^T$; here, $N=L_1 N_1 * L_2 N_2$), and $n_k$ is noise. That is, the SR technique refers to a technique for estimating x by applying the inverse function of the estimated resolution degradation factors to $y_k$. The SR technique may be largely divided into a statistical scheme and a multi-frame scheme, and the multi-frame scheme may be largely divided into a space division scheme and a time division scheme. When the SR technique is used to acquire a depth map, the inverse function of $M_k$ of Equation 1 is not present, and thus the statistical scheme may be tried. However, the statistical scheme requires a repeated computation process and thus has low efficiency.

In order to apply the SR technique to depth map extraction, the image control unit 150 may generate a plurality of low-resolution subframes using an electric signal received from the image sensor unit 130 and then may extract a plurality of low-resolution depth maps using the plurality of low-resolution subframes. Also, the image control unit 150 may rearrange pixel values of the plurality of low-resolution depth maps to extract a high-resolution depth map.

Here, the term "high resolution" has a relative meaning that represents a higher resolution than "low resolution."

Here, the term "subframe" may refer to image data generated from any integration time and an electric signal corresponding to a reference signal. For example, when an electric signal is generated using eight reference signals during a first integration time, i.e., one image frame, eight subframes may be generated, and one start frame may be further generated. Herein, a subframe may be used interchangeably with image data, subframe image data, etc.

Alternatively, in order to apply the SR technique according to an embodiment of the present invention to depth map extraction, the image control unit 150 may generate a plurality of low-resolution subframes using an electric signal received from the image sensor unit 130 and then may rearrange pixel values of the plurality of low-resolution subframes to generate a plurality of high-resolution subframes. Also, the image control unit 150 may extract a high-resolution depth map using the high-resolution subframes.

To this end, a pixel shift technique may be used. That is, the image control unit 150 may acquire several sheets of image data shifted by a subpixel for each subframe using the pixel shift technique, acquire a plurality of pieces of high-resolution subframe image data by applying the SR technique for each subframe, and extract a high-resolution depth map using the high-resolution subframe image data. In order to perform pixel shift, the ToF camera module 100 according to an embodiment of the present invention includes the tilting unit 140.

Referring to FIG. 1 again, the tilting unit 140 changes an optical path of at least one of an incident light signal or a reflected light signal in units of subpixels of the image sensor unit 130.

For each image frame, the tilting unit 140 changes an optical path of at least one of an incident light signal or a reflected light signal. As described above, one image frame may be generated at every integration time. Accordingly, when one integration time ends, the tilting unit 140 changes an optical path of at least one of an incident light signal or a reflected light signal.

The tilting unit 140 changes an optical path of an incident light signal or a reflected light signal in units of subpixels with respect to the image sensor unit 130. In this case, the tilting unit 140 changes an optical path of at least one of an incident light signal or a reflected light signal upward, downward, leftward or rightward with respect to the current optical path.

Figure 6A:
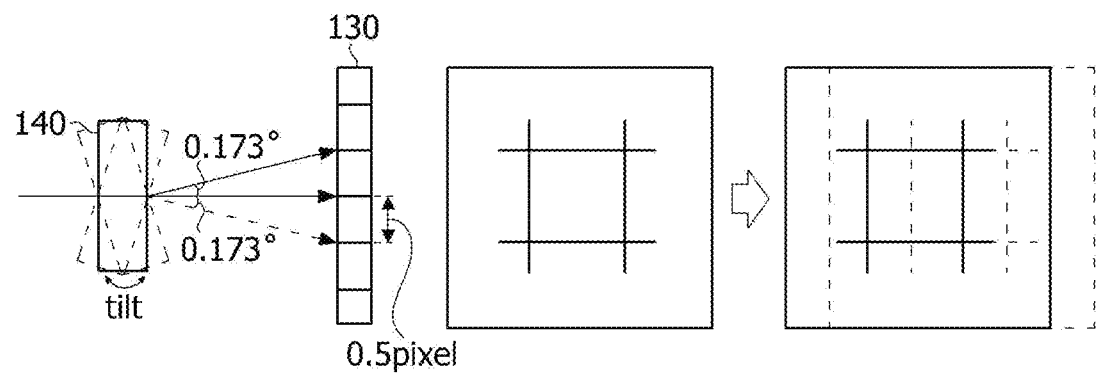
FIGS. 6A and 6B are diagrams illustrating that a tilting unit 140 changes an optical path of a reflected light signal.
Figure 6B:
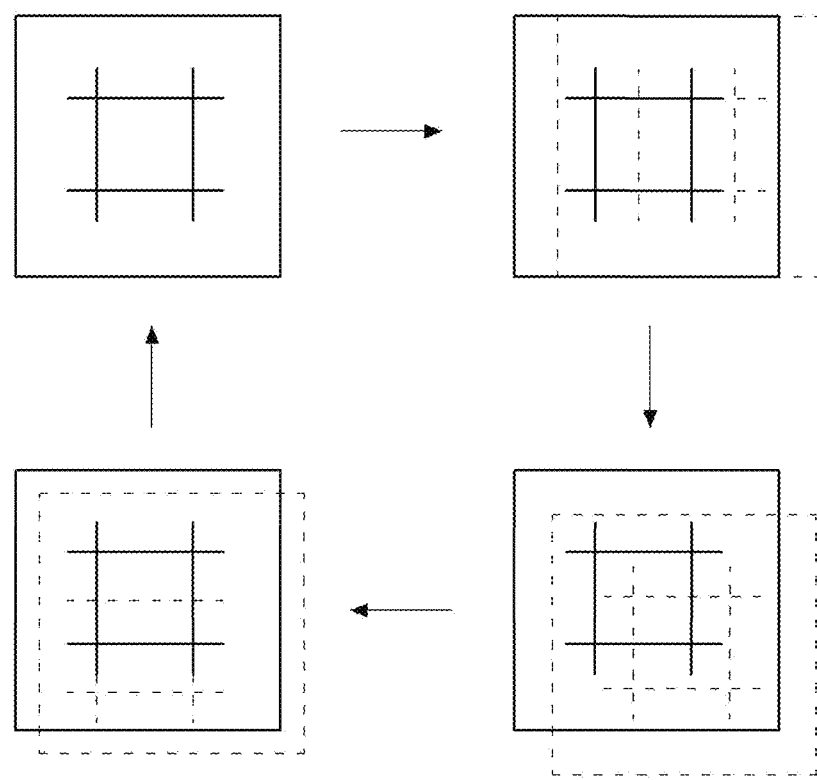

FIGS. 6A and 6B are diagrams illustrating that the tilting unit 140 changes an optical path of a reflected light signal.

In FIG. 6A, a portion indicated by solid lines indicates a current optical path of the reflected light signal, and a portion indicated by dotted lines indicates a changed optical path. When an integration time corresponding to the current optical path ends, the tilting unit 140 may change the optical path of the reflected light signal as represented by dotted lines. Thus, the path of the reflected light signal is shifted by a subpixel from the current optical path. For example, as shown in FIG. 6A, when the tilting unit 140 shifts the current optical path to the right by 0.173 degrees, the reflected light signal incident on the image sensor unit 130 may be shifted to the right by 0.5 pixels (subpixels).

According to an embodiment of the present invention, the tilting unit 140 may change an optical path of a reflected light signal clockwise with respect to a reference position. For example, as shown in FIG. 6B, after a first integration time ends, the tilting unit 140 shifts the optical path of the reflected light signal to the right by 0.5 pixels with respect to the image sensor unit 130 during a second integration time. Also, the tilting unit 140 shifts the optical path of the reflected light signal downward by 0.5 pixels with respect to the image sensor unit 130 during a third integration time. Also, the tilting unit 140 shifts the optical path of the reflected light signal leftward by 0.5 pixels with respect to the image sensor unit 130 during a fourth integration time. Also, the tilting unit 140 shifts the optical path of the reflected light signal upward by 0.5 pixels with respect to the image sensor unit 130 during a fifth integration time. That is, the tilting unit 140 may shift the optical path of the reflected light signal to its original position during four integration times. This can be applied in the same way even when an optical path of an incident light signal is shifted, and a detailed description thereof will be omitted. Also, the optical path change pattern being clockwise is just an example, and the optical path change pattern may be counterclockwise.

Meanwhile, the subpixel may be greater than zero pixels and smaller than one pixel. For example, the subpixel may have a size of 0.5 pixels and may have a size of ⅓ pixels. The size of the subpixel can be changed in design by a person skilled in the art.

Figure 7:
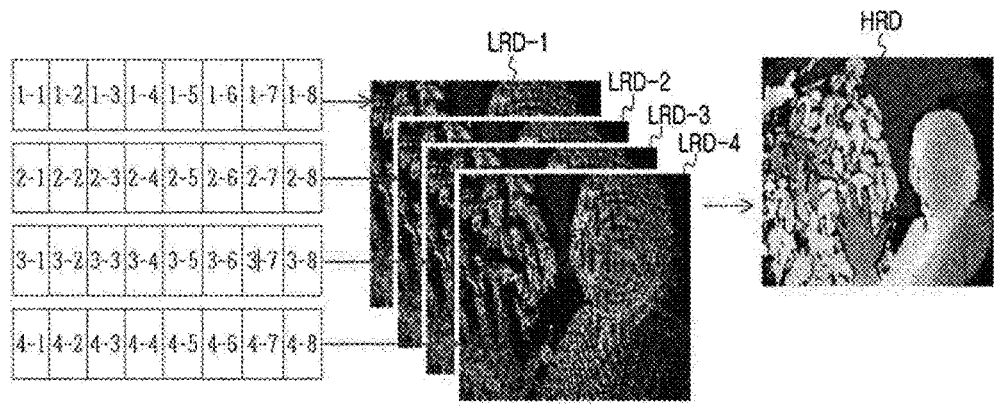
FIGS. 7 and 8 are diagrams illustrating an SR technique according to an embodiment of the present invention.
Figure 8:
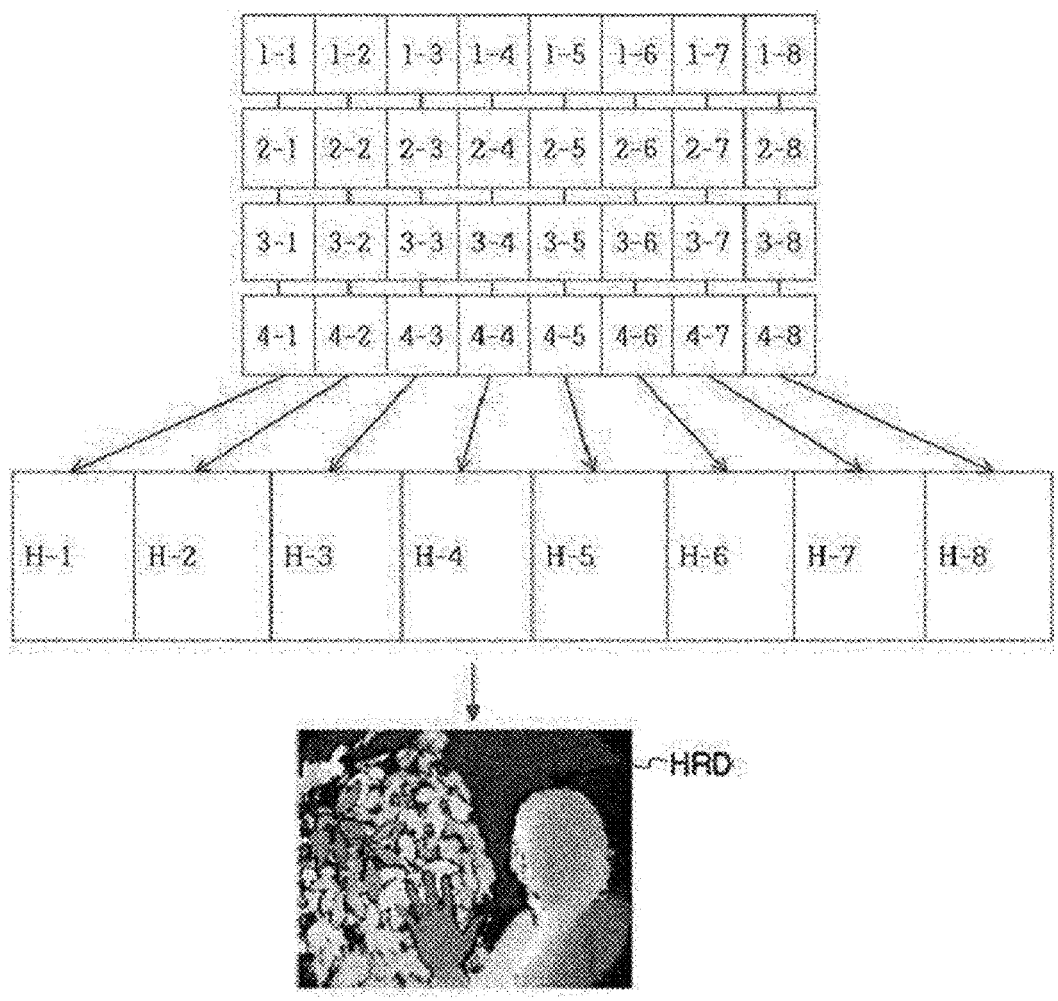

FIGS. 7 and 8 are diagrams illustrating an SR technique according to an embodiment of the present invention.

Referring to FIG. 7, the image control unit 150 may extract a plurality of low-resolution depth maps using a plurality of low-resolution sub-frames generated during the same integration time, i.e., during the same frame. Also, the image control unit 150 may rearrange pixel values of the plurality of low-resolution depth maps to extract a high-resolution depth map. Here, optical paths of incident light signals or reflected light signals corresponding to the plurality of low-resolution depth maps may be different from each other.

For example, the image control unit 150 may generate low-resolution subframes 1-1 to 4-8 using a plurality of electric signals. Low-resolution subframes 1-1 to 1-8 are low-resolution subframes generated during the first integration time. Low-resolution subframes 2-1 to 2-8 are low-resolution subframes generated during the second integration time. Low-resolution subframes 3-1 to 3-8 are low-resolution subframes generated during the third integration time. Low-resolution subframes 4-1 to 4-8 are low-resolution subframes generated during the fourth integration time. Thus, the image control unit 150 applies a depth map extraction technique to the plurality of low-resolution subframes generated for each integration time to extract low-resolution depth maps LRD-1 to LRD-4. Low-resolution depth map LRD-1 is a low-resolution depth map extracted using subframes 1-1 to 1-8. Low-resolution depth map LRD-2 is a low-resolution depth map extracted using subframes 2-1 to 2-8. Low-resolution depth map LRD-3 is a low-resolution depth map extracted using subframes 3-1 to 3-8. Low-resolution depth map LRD-4 is a low-resolution depth map extracted using subframes 4-1 to 4-8. Also, the image control unit 150 rearranges pixel values of low-resolution depth maps LRD-1 to LRD-4 to extract high-resolution depth map HRD.

Alternatively, as described above, the image control unit 150 may rearrange pixel values of a plurality of subframes corresponding to the same reference signal to generate a high-resolution subframe. In this case, the plurality of subframes have different optical paths of corresponding incident light signals or reflected light signals. Also, the image control unit 150 may extract a high-resolution depth map using a plurality of high-resolution subframes.

For example, as shown in FIG. 8, the image control unit 150 generates low-resolution subframes 1-1 to 4-8 using a plurality of electric signals. Low-resolution subframes 1-1 to 1-8 are low-resolution subframes generated during the first integration time. Low-resolution subframes 2-1 to 2-8 are low-resolution subframes generated during the second integration time. Low-resolution subframes 3-1 to 3-8 are low-resolution subframes generated during the third integration time. Low-resolution subframes 4-1 to 4-8 are low-resolution subframes generated during the fourth integration time. Here, low-resolution subframes 1-1, 2-1, 3-1, and 4-1 correspond to the same reference signal $C_1$ and different optical paths. Then, the image control unit 150 may rearrange pixel values of low-resolution subframes 1-1, 2-1, 3-1, and 4-1 to generate high-resolution subframe H-1. When high-resolution subframes H1 to H8 are generated through the rearrangement of the pixel values, the image control unit may apply the depth map extraction technique to high-resolution subframes H-1 to H-8 to extract a high-resolution depth map HRD.

Figure 9:
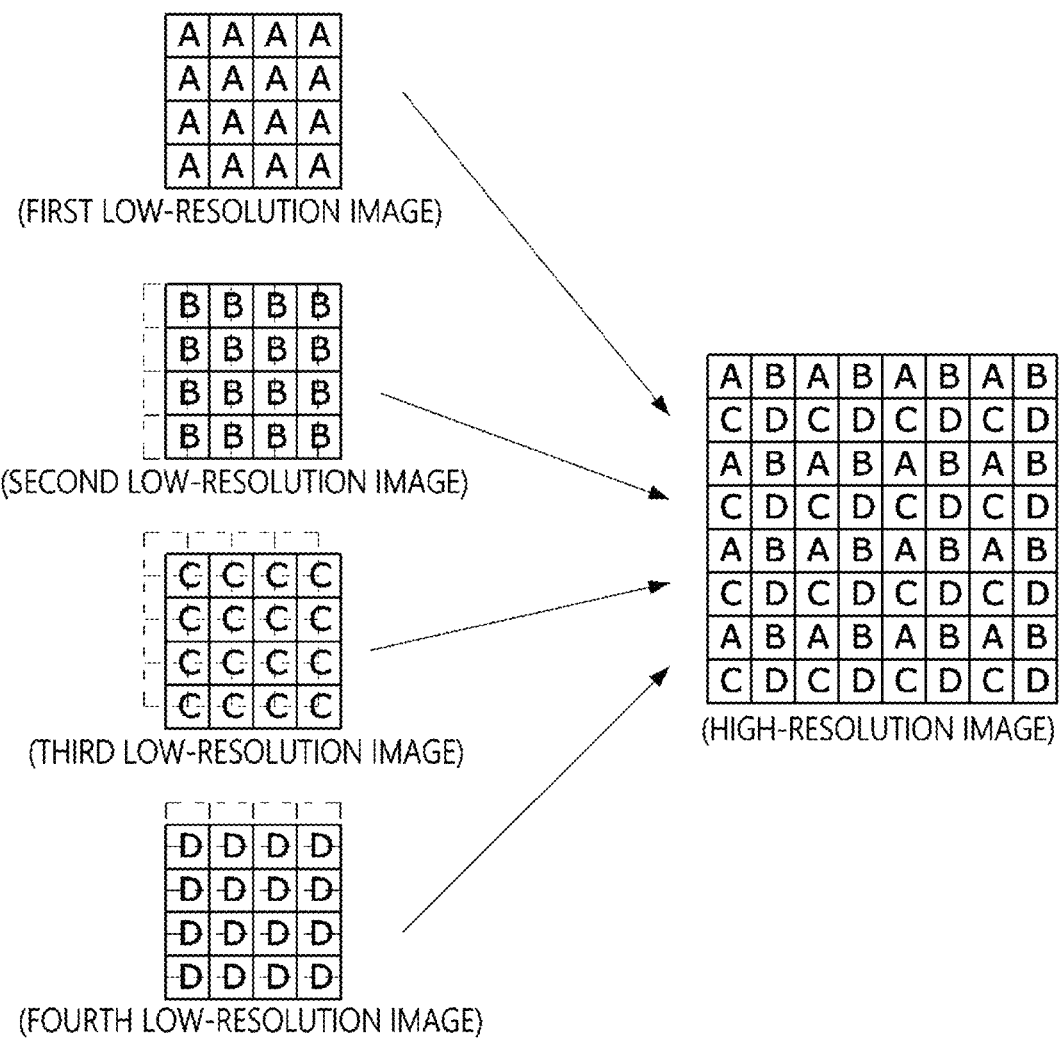
FIG. 9 is a diagram illustrating a pixel value arrangement process according to an embodiment of the present invention.

FIG. 9 is a diagram illustrating a pixel value arrangement process according to an embodiment of the present invention.

Here, it is assumed that four low-resolution images having a size of 4×4 are used to generate one high-resolution image having a size of 8×8. In this case, the high-resolution pixel grid has 8×8 pixels, which are the same as pixels of a high-resolution image. Here, the low-resolution image may have a meaning including a low-resolution subframe and a low-resolution depth map, and the high-resolution image may have a meaning including a high-resolution subframe and a high-resolution depth map.

In FIG. 9, first to fourth low-resolution images are images captured when an optical path is shifted in units of a subpixel with a 0.5-pixel size. The image control unit 150 arranges pixel values of the second to fourth low-resolution images to fit the high-resolution image in a direction in which the optical path is shifted with respect to the first low-resolution image in which the optical path is not shifted.

In detail, the second low-resolution image is an image shifted to the right by a subpixel from the first low-resolution image. Therefore, a pixel B of the second low-resolution image is arranged in a pixel located to the right of each pixel A of the first low-resolution image.

The third low-resolution image is an image shifted downward by a subpixel from the second low-resolution image. Therefore, a pixel C of the third low-resolution image is arranged in a pixel located under each pixel B of the second low-resolution image.

The fourth low-resolution image is an image shifted to the left by a subpixel from the third low-resolution image. Therefore, a pixel D of the fourth low-resolution image is arranged in a pixel located to the left of the pixel C of the third low-resolution image.

When all pixel values of the first to fourth low-resolution images are rearranged in a high-resolution pixel grid, a high-resolution image frame which has a resolution four times that of a low-resolution image is generated.

Meanwhile, the image control unit 150 may apply a weight value to an arranged pixel value. In this case, the weight value may be set differently depending on the size of the subpixel or the shift direction of the optical path and may be set differently for each low-resolution image.

To this end, the tilting unit 140 may change the optical path through software or hardware. The amount of calculation of the ToF camera module 100 increases when the tilting unit 140 changes the optical path through software, and the ToF camera module 100 becomes complicated in structure or increases in volume when the tilting unit 140 change the optical path through hardware.

According to an embodiment of the present invention, the tilting unit 140 obtains data shifted by a subpixel using a method of controlling the slope of a lens assembly, e.g., an IR filter 318 (see FIG. 2) included in the lens assembly.

Figure 10:
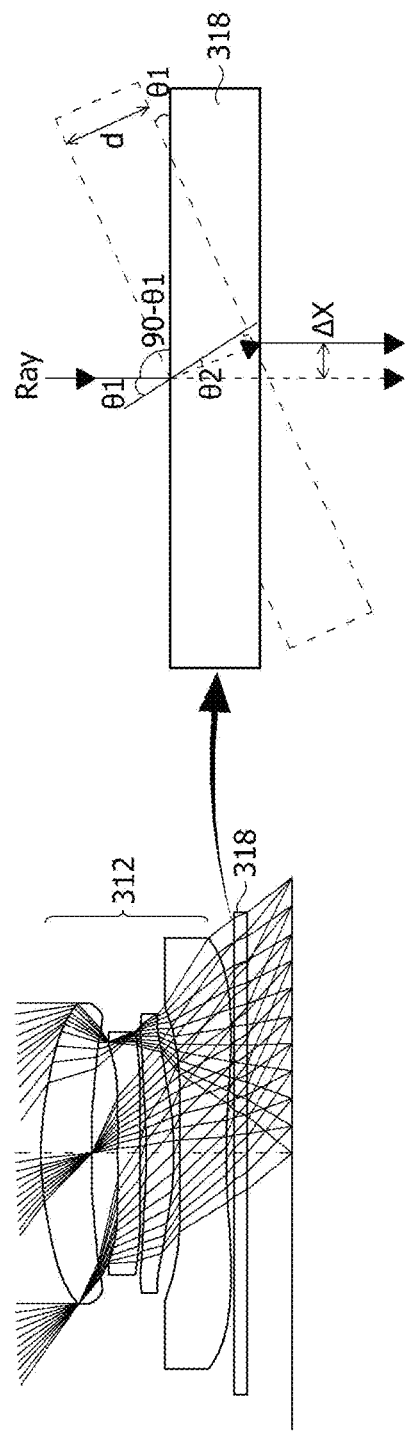
FIGS. 10 and 11 are diagrams illustrating an effect of shifting an image frame input to an image sensor by controlling a slope of an infrared (IR) filter.
Figure 11:
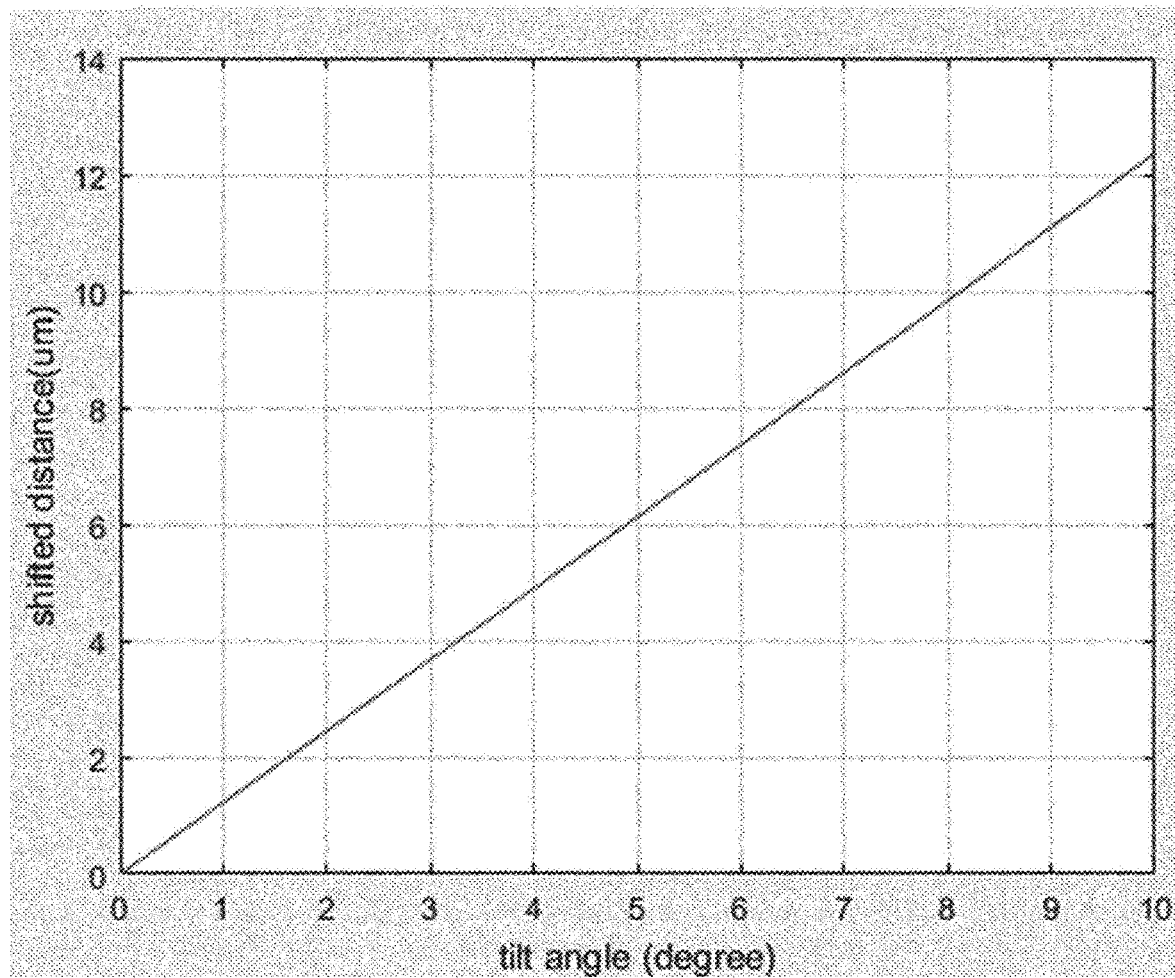

FIGS. 10 and 11 are diagrams illustrating an effect of shifting an image frame input to an image sensor by controlling the slope of an IR filter. FIG. 11 shows a result of simulating a distance shifted for a tilting angle under the condition that the thickness of the IR filter is 0.21 mm and that the refractive index of IR is 1.5.

Referring to FIG. 10 and the following Equation 4, the shifted distance and the slope $\theta_1$ of the IR filter 318 may have the following relationship.

$$\Delta x = d\cos\theta_1 \left( \frac{1}{\tan(90° - \theta_1)} - \frac{1}{\tan(90° - \theta_2)} \right) \quad \text{Equation 4}$$

where $\theta_2$ may be expressed using Equation 5 below:

$$\theta_2 = \sin^{-1}\left( \frac{\sin\theta_1}{n_g} \right) \quad \text{Equation 5}$$

where $\theta_1$ is the slope of the IR filter 318, i.e., a tilting angle of the IR filter 318, $n_g$ is the refractive index of the IR filter 318, and d is the thickness of the IR filter 318. For example, referring to Equations 4 and 5, the IR filter 318 may be tilted by about 5 to 6 degrees in order to shift an image frame input to the image sensor by 7 μm. In this case, the vertical displacement of the IR filter 318 may be about 175 to 210 μm.

When the slope of the IR filter 318 is controlled as described above, it is possible to obtain shifted image data without tilting the image sensor 320.

According to an embodiment of the present invention, the tilting unit for controlling the slope of the IR filter may include a voice coil motor (VCM), and the IR filter 318 may be disposed between the image sensor and the VCM.

Figure 12:
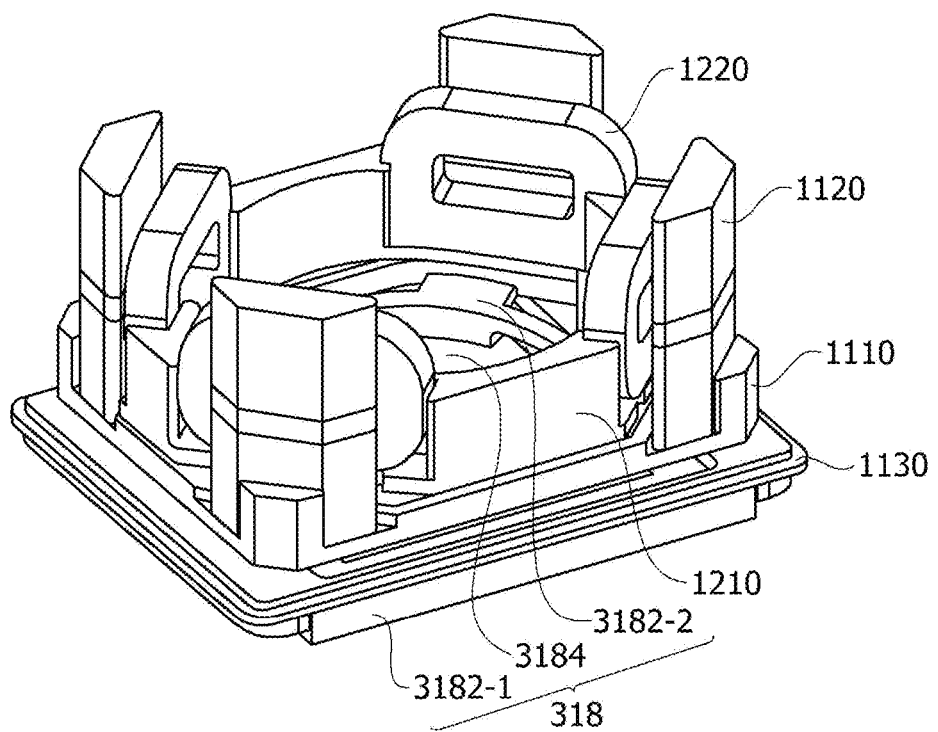
FIG. 12 is a perspective view of a voice coil motor (VCM) and an IR filter according to an embodiment of the present invention.
Figure 13A:
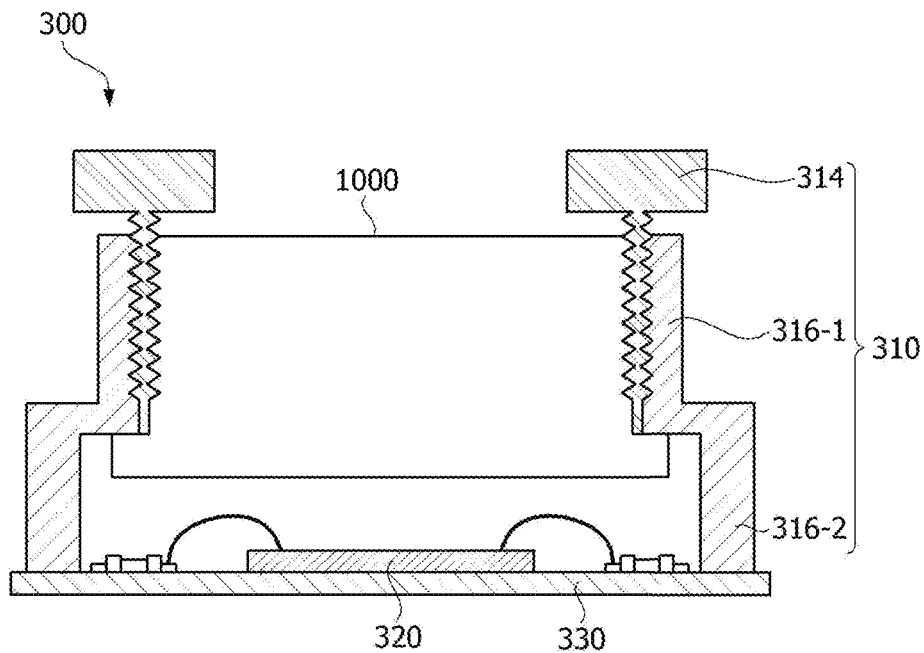
FIGS. 13A and 13B are cross-sectional views of a ToF camera module including a VCM and an IR filter according to an embodiment of the present invention.
Figure 13B:
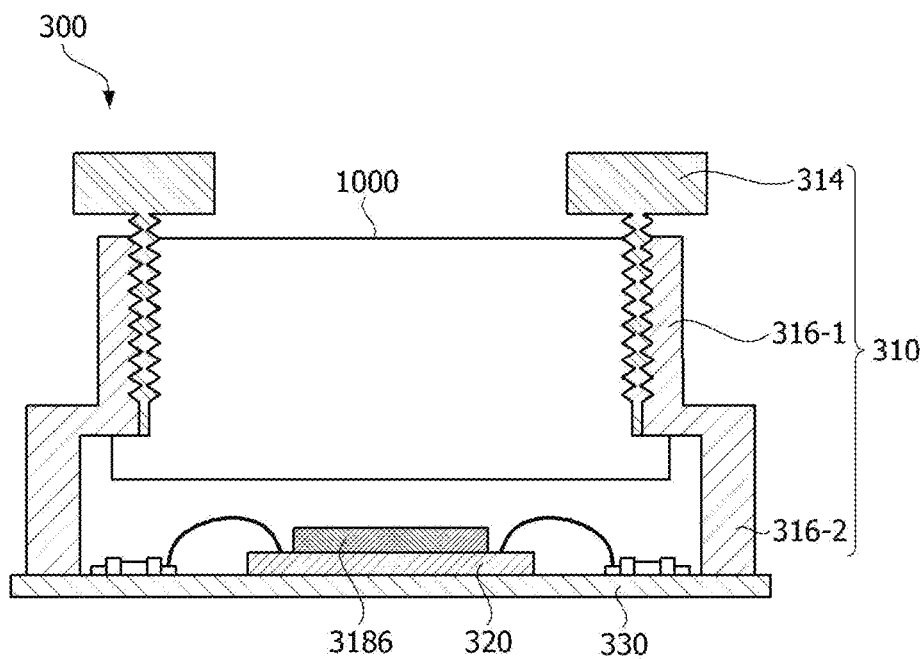
Figure 14:
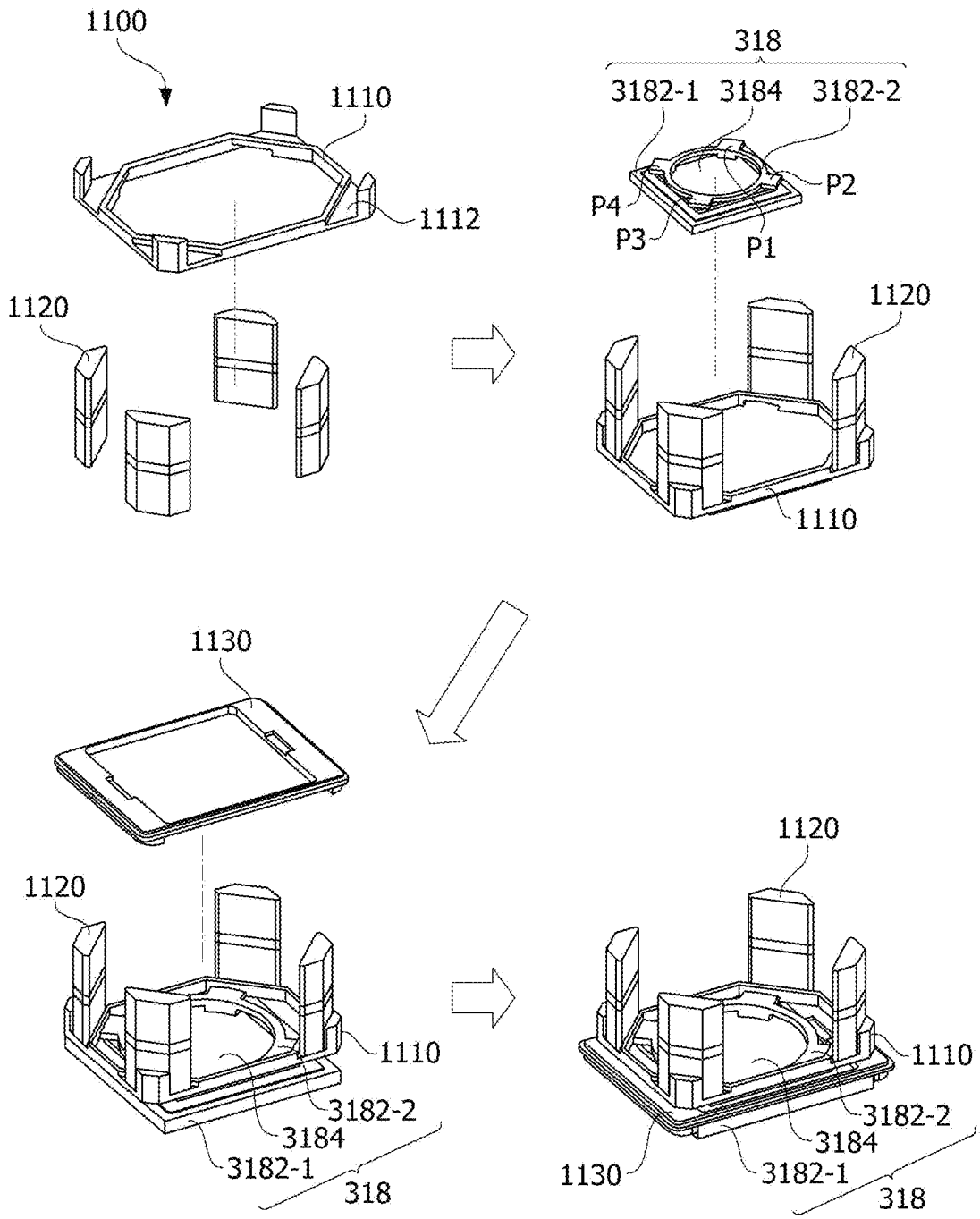
FIG. 14 is a diagram showing a process of coupling an IR filter and a magnet assembly included in a VCM according to an embodiment of the present invention.
Figure 15:
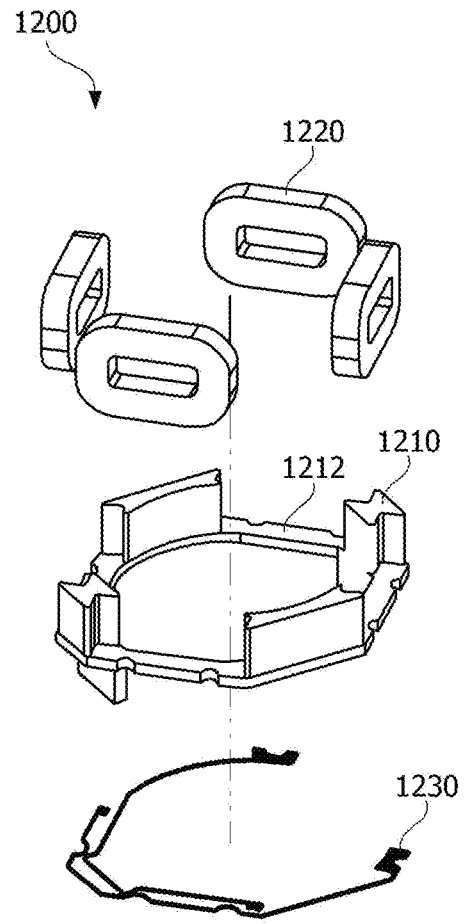
FIG. 15 is a diagram showing a coupling process of a coil assembly included in a VCM according to an embodiment of the present invention.
Figure 15:
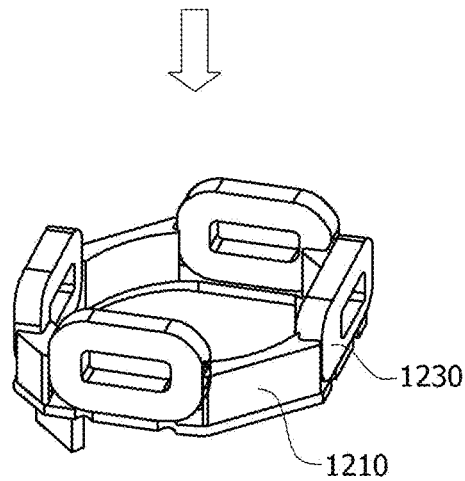
Figure 16:
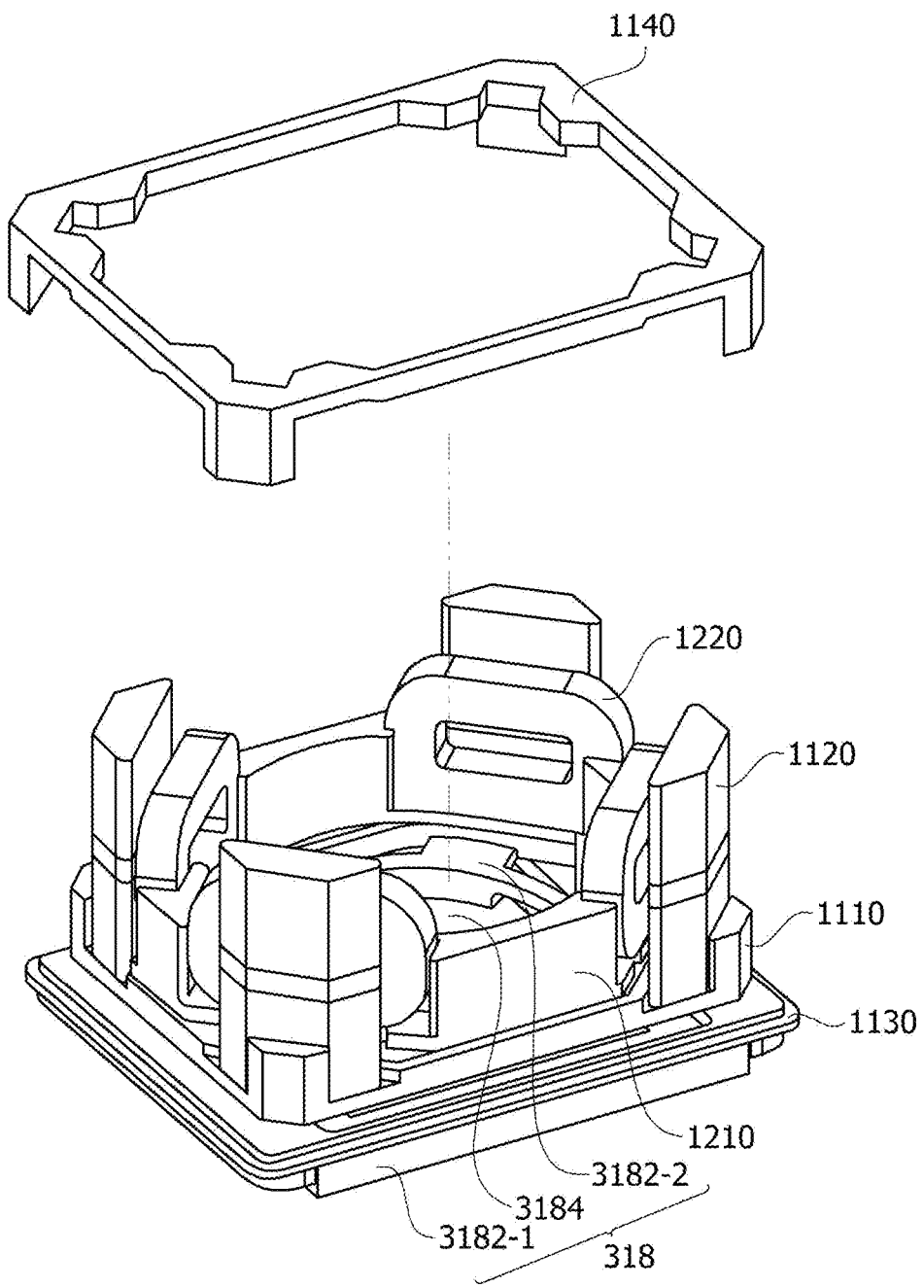
FIG. 16 is a diagram showing a process of coupling a magnet assembly, an IR filter, and a coil assembly according to an embodiment of the present invention.

FIG. 12 is a perspective view of a VCM and an IR filter according to an embodiment of the present invention, FIGS. 13A and 13B are cross-sectional views of a ToF camera module including a VCM and an IR filter according to an embodiment of the present invention, FIG. 14 is a diagram showing a process of coupling an IR filter and a magnet assembly included in a VCM according to an embodiment of the present invention, FIG. 15 is a diagram showing a coupling process of a coil assembly included in a VCM according to an embodiment of the present invention, and FIG. 16 is a diagram showing a process of coupling a magnet assembly, an IR filter, and a coil assembly according to an embodiment of the present invention.

Referring to FIGS. 12 to 16, the tilting unit 140 may include a VCM 1000, and the VCM 1000 may include a magnet assembly 1100 and a coil assembly 1200 and may be coupled to, brought into contact with, or connected to the IR filter 318.

In FIG. 13A, for convenience of description, it is shown that the VCM 1000 is surrounded by the lens barrel 314 and the lens holder 318 and that the lens 312 and the IR filter 318 are omitted. However, the lens 312 and the IR filter 318 may be arranged as shown in FIG. 3. That is, the lens 312 may be surrounded by the lens barrel 314 or may be accommodated in a space of the VCM 1000. Alternatively, the lens barrel 314 may be an element of the VCM 1000.

According to an embodiment of the present invention, the magnet assembly 1100 may include a magnet holder 1110 and a plurality of magnets 1120, and the plurality of magnets 1120 may be spaced apart on the magnet holder 1110 at predetermined intervals. For example, the magnet holder 1110 may have a hollow circular ring shape or a quadrilateral ring shape, and a plurality of magnet guides 1112 may be formed to accommodate the plurality of magnets 1120.

Here, the magnet holder 1110 may contain a magnetic material or a soft magnetic material, e.g., Fe.

Subsequently, the coil assembly 1200 may include a coil holder 1210, a plurality of coils 1220, and a coil terminal 1230, and the plurality of coils 1220 may be disposed on the coil holder 1210 and spaced apart from one another at predetermined intervals to make pairs with the plurality of magnets. For example, the coil holder 1210 may have a hollow circular ring shape or a quadrilateral ring shape, and a plurality of coil guides 1212 may be formed to accommodate the plurality of coils 1220. The coil holder 1210 may be the lens barrel 314. The coil terminal 1230 may be connected to the plurality of coils 1220 and may apply power to the plurality of coils 1220.

The IR filter 318 includes a glass layer holder 3182 and a glass layer 3184 supported by the glass layer holder 3182. The glass layer holder 3182 may include a first glass layer holder 3182-1 disposed under the glass layer 3184 and a second glass layer holder 3182-2 disposed on an upper edge of the glass layer 3184. The second glass layer holder 3182-2 may have a hollow circular ring shape or a quadrilateral ring shape and may be disposed in a hollow of the magnet holder 1110 and surrounded by the magnet holder 1110. In this case, the second glass layer holder 3182-2 may include a plurality of protrusions P1, P2, P3, and P4 corresponding to the plurality of magnet guides 1112 of the magnet holder 1110. The plurality of protrusions P1, P2, P3, and P4 may be moved such that the protrusions are brought into contact with or spaced apart from the plurality of magnet guides 1112. The second glass layer holder 3182-2 may contain a magnetic material or a soft magnetic material.

When power is applied to the plurality of coils 1220 through the coil terminal 1230, an electric current flows through the plurality of coils 1220, and thus it is possible to generate a magnetic field between the plurality of coils 1220 and the plurality of magnets 1120.

Thus, an electric driving force may be generated between the plurality of magnet guides 1112 and the plurality of protrusions P1, P2, P3, and P4 of the second glass layer holder 3182-2, and the glass layer 3184 supported by the second glass layer holder 3182-2 may be tilted at a predetermined angle.

For example, a slope formed between the protrusion P1 and the protrusion P3 or a slope formed between the protrusion P2 and the protrusion P4 may vary depending on a force applied between the plurality of magnet guides 1112 and the plurality of protrusions P1, P2, P3, and P4.

Also, the slope of the glass layer 3184 may vary depending on the slope formed between the protrusion P1 and the protrusion P3 or the slope formed between the protrusion P2 and the protrusion P4. Here, the slope of the IR filter 318, and particularly, the slope of the glass layer 3184 varies depending on the positions of the plurality of protrusions P1, P2, P3, and P4 of the second glass layer holder 3182-2. Accordingly, the second glass layer holder 3182-2 may be referred to herein as a shaper.

In this case, for the degree of freedom of tilting of the glass layer 3184, a spacer 1130 may be further disposed between the magnet holder 1110 and the first glass layer holder 3182-1.

Here, the glass layer 3184 may be an IR-pass glass layer. Alternatively, as shown in FIG. 13B, the glass layer 3184 may be a general glass layer, and the IR filter 318 may further include an IR pass glass layer 3186 spaced apart from the glass layer 3184 and disposed on the image sensor 320. When the IR pass glass layer 3186 is disposed on the image sensor 320, it is possible to reduce the possibility of moisture or foreign matter directly penetrating into the image sensor 320.

Meanwhile, according to an embodiment of the present invention, the magnet assembly 1110 may further include a magnet holder 1140. The magnet holder 1140 may support upper portions of the plurality of magnets 1120, and thus the plurality of magnets 1120 may move more stably and reliably.

As described above, according to an embodiment of the present invention, the slope of the IR filter 318 may be controlled according to the driving of the VCM 1000. To this end, the IR filter 318 should be disposed together with the VCM 1000, and thus the IR filter 318 needs to be spaced apart from the image sensor 320.

Meanwhile, according to an embodiment of the present invention, the slope of the IR filter 318 needs to be frequently changed, and thus a free space for the movement of the IR filter 318 is required. In this case, the possibility of moisture, foreign matter, and the like penetrating into the free space for the movement of the IR filter 318 increases, and thus the image sensor 320 may be easily exposed to moisture or foreign matter.

In an embodiment of the present invention, a component for inhibiting the image sensor 320 from being exposed to moisture, foreign matter, and the like may be further included.

Figure 17:
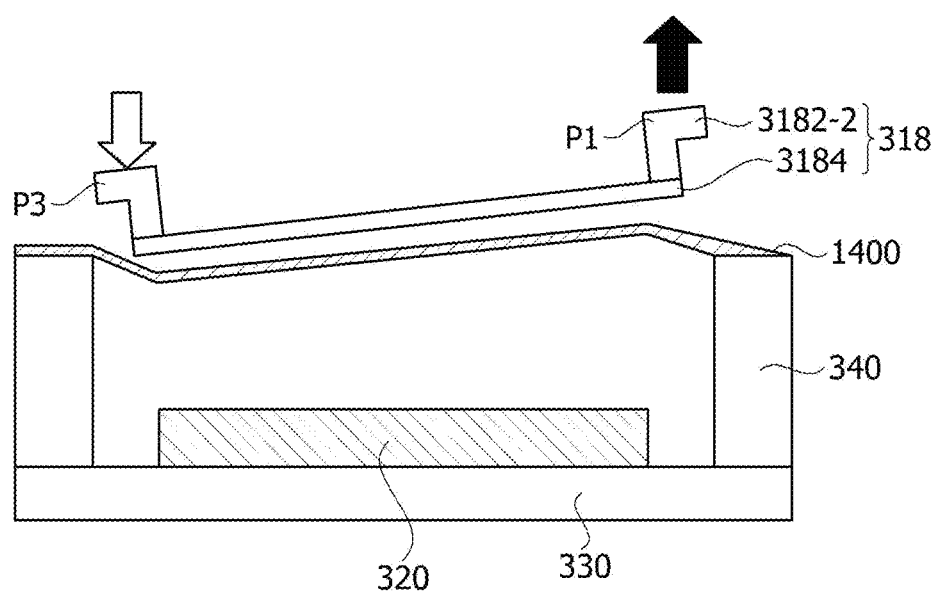
FIG. 17 is a cross-sectional view of a portion of a camera module according to an embodiment of the present invention.

FIG. 17 is a cross-sectional view of a portion of a camera module according to an embodiment of the present invention. Here, for convenience of description, an upper portion of the camera module, e.g., the lens, the lens barrel, the VCM, and the like are omitted, but the description of FIGS. 3 and 10 to 14 may be equally applied.

Referring to FIG. 17, an image sensor 320 may be mounted on a printed circuit board 330 and accommodated in a housing 340. Here, the housing may be a second lens holder 316-2. The slope of the IR filter 318 may be controlled by the VCM 1000 (see FIGS. 12 to 16). For example, when a first protrusion P1 of a first glass layer holder 3182-1 faces upward and the third protrusion P3 faces downward due to the driving of the VCM 1000, a glass layer 3184 of an IR filter 318 may be tilted.

According to an embodiment of the present invention, an elastic film 1400 may be disposed between the IR filter 318 and the image sensor 320. The elastic film 1400 may be fastened to the housing 340. In this case, one face of the elastic film 1400 may be fastened to the housing 340, and the other face of the elastic film 1400 may be coupled to the tilting unit 140. The elastic film 1400 may be, for example, a reverse osmosis (RO) membrane, a nano filtration (NF) membrane, an ultra-filtration (UF) membrane, a micro filtration (MF) membrane, or the like. Here, the RO membrane is a membrane having a pore size of about 1 to 15 angstroms, the NF membrane is a membrane having a pore size of about 10 angstroms, the UF membrane is a membrane having a pore size of about 15 to 200 angstroms, and the MF membrane is a membrane having a pore size of about 200 to 1000 angstroms. Accordingly, it is possible to inhibit moisture, foreign matter, and the like from penetrating into a space between the IR filter 318 and the housing 340, that is, the space arranged for the movement of the IR filter 318.

In this case, the elastic film 1400 may be a transparent and stretchable film with a thickness of 25 to 50 and the IR filter 318 may be disposed on the elastic film 1400 so that at least a portion of the IR filter 318 can be in direct contact with the elastic film 1400. That is, the shape of the elastic film 1400 may be controlled by the tilting unit 1400. Thus, when the IR filter 318 is inclined, the elastic film 1400 may be stretched or contracted together with the IR filter 318. When the IR filter 318 returns to its original position, the elastic film 1400 may be restored immediately along with the IR filter 318. Accordingly, it is possible to stably support the movement of the IR filter 318.

FIGS. 18 to 23 show various examples of placing an elastic film.

Figure 18:
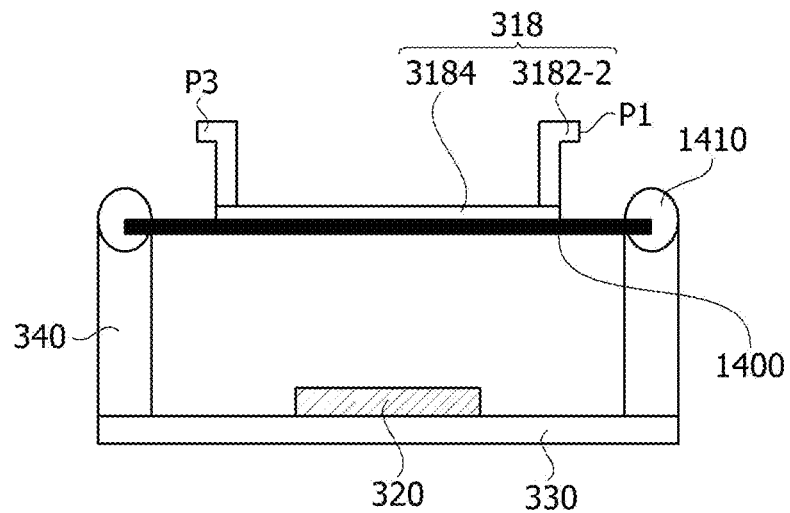
FIGS. 18 to 23 show various examples of placing an elastic film.

Referring to FIG. 18, the elastic film 1400 may be adhered to the housing 340 for accommodating the image sensor 320 through an adhesive 1410.

Figure 19:
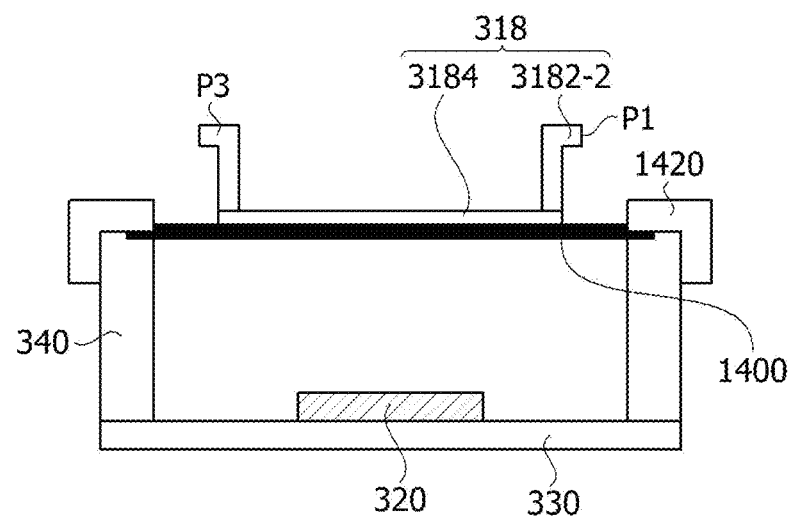

Referring to FIG. 19, the elastic film 1400 may be fastened to the housing 340 for housing the image sensor 320 through an instrument 1420.

Figure 20:
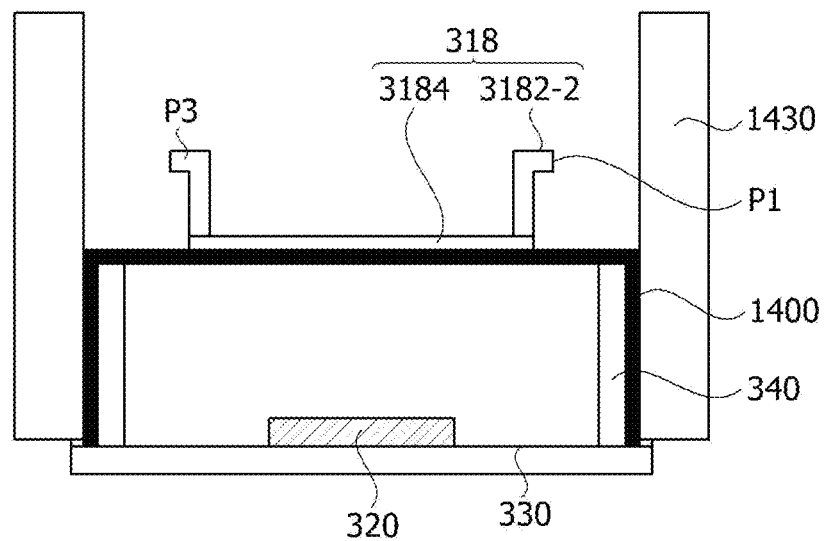

Referring to FIG. 20, the elastic film 1400 may be disposed to cover the outer circumferential surface of the housing 340 for accommodating the image sensor 320. In order to fasten the elastic film 1400, an additional fastening member 1430 may be disposed to surround the outer circumferential surface of the housing 340.

Figure 21:
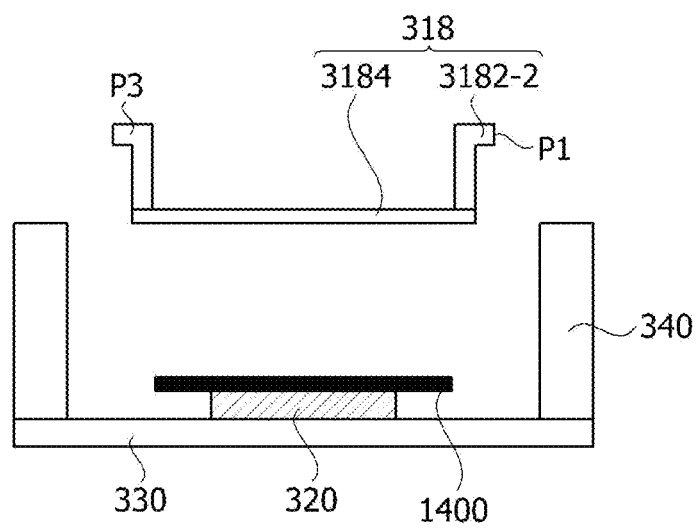

Referring to FIG. 21, the elastic film 1400 may be disposed directly on the image sensor 320.

Figure 22:
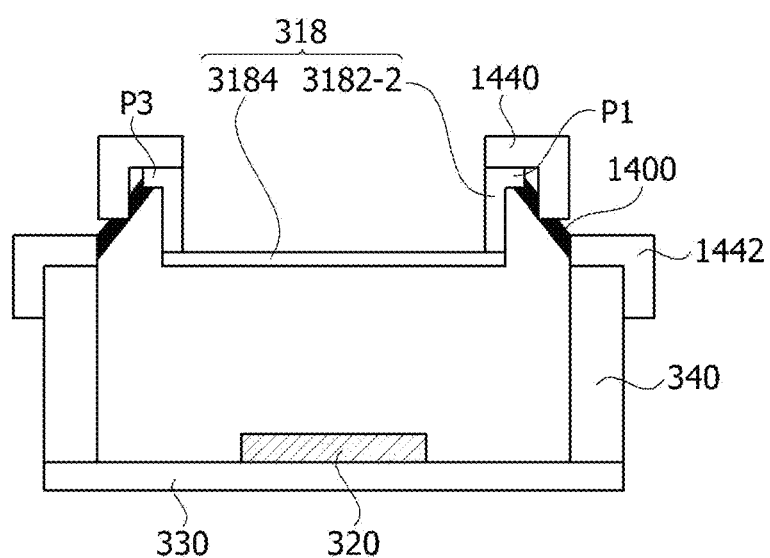

Referring to FIG. 22, the elastic film 1400 may be disposed between the first glass layer holder 3182-1 and the housing 340 and fastened by instructions 1440 and 1442.

Figure 23:
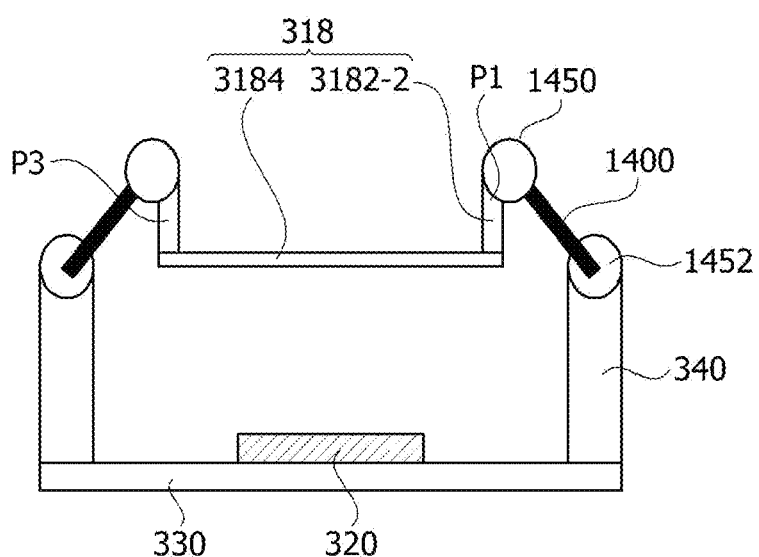

Referring to FIG. 23, the elastic film 1400 may be adhered to the first glass layer holder 3182-1 and the housing 340 through adhesives 1450 and 1452.

While the present invention has been described with reference to exemplary embodiments, these are just examples and do not limit the present invention. It will be understood by those skilled in the art that various modifications and applications may be made therein without departing from the essential characteristics of the embodiments. For example, elements described in the embodiments above in detail may be modified and implemented. Furthermore, differences associated with such modifications and applications should be construed as being included in the scope of the present invention defined by the appended claims.

DESCRIPTION OF THE SYMBOLS

| 100: ToF camera module | 110: lighting unit |
| 120: lens unit | 130: image sensor unit |
| 140: tilting unit | 150: image control unit |

The invention claimed is:

1. A camera module comprising:
a lighting unit configured to output an incident light signal to be emitted to an object;
a lens unit configured to collect a reflected light signal reflected from the object;
an image sensor unit configured to generate an electric signal from the reflected light signal collected by the lens unit;
a tilting unit configured to shift an optical path of the reflected light signal; and
an image control unit configured to extract a depth information of the object from a frame shifted by the tilting unit using a phase difference between the incident light signal and the reflected light signal received by the image sensor unit,
wherein the lens unit is disposed on the image sensor unit,
wherein the lens unit comprises an infrared (IR) filter disposed on the image sensor unit and at least one lens disposed on the IR filter,
wherein the tilting unit controls a slope of the IR filter,
wherein the tilting unit comprises a voice coil motor (VCM),
wherein the VCM comprises a plurality of magnets and a plurality of magnet guides configured to accommodate the plurality of magnets,
wherein the IR filter comprises a glass layer and a glass layer holder configured to support the glass layer, and
wherein the glass layer holder comprises a plurality of protrusions corresponding to the plurality of magnet guides.

2. The camera module of claim 1,
wherein the IR filter is disposed between the image sensor unit and the VCM.

3. The camera module of claim 2, wherein the VCM comprises:
a magnet holder;

the plurality of magnets disposed on the magnet holder and spaced apart from one another at predetermined intervals;

a coil holder; and a plurality of coils disposed on the coil holder and spaced apart from one another at predetermined intervals to make pairs with the plurality of magnets.

4. The camera module of claim 3, wherein at least a portion of the glass layer holder is surrounded by the magnet holder.

5. The camera module claim 1, wherein the glass layer is an IR pass glass layer.

6. The camera module of claim 1, wherein the IR filter comprises an IR pass glass layer disposed on the image sensor unit and spaced apart from the glass layer.

7. The camera module of claim 1, wherein the tilting unit is configured to shift the optical path of the reflected light signal at every integration time.

8. The camera module of claim 7, wherein the tilting unit is configured to shift the optical path of the reflected light signal in a unit of subpixel which is greater than 0 pixel and smaller than 1 pixel.

9. The camera module of claim 7, wherein the tilting unit is configured to shift the optical path of the reflected light signal during a first integration time in a first direction, shift the optical path of the reflected light signal during a second integration time in a second direction, shift the optical path of the reflected light signal during a third integration time in a third direction, and shift the optical path of the reflected light signal during a fourth integration time in a fourth direction.

10. The camera module of claim 7, wherein the lighting unit is configured to output a plurality of incident light signals having different frequencies.

11. The camera module of claim 10, wherein the image sensor unit is configured to mix the reflected light signal with a plurality of reference signals having a predetermined phase differences.

12. The camera module of claim 11, wherein the image control unit is configured to extract the depth information using a plurality of subframes generated in different integration times.

13. The camera module of claim 11, wherein the image control unit is configured to extract the depth information using a plurality of subframes generated in different reference signals.

14. The camera module of claim 1, comprising an elastic film disposed between the image sensor and the IR filter.

15. The camera module of claim 14, comprising a housing configured to accommodate the image sensor, wherein the elastic film is adhered to the housing.

16. A camera module comprising;

a lighting unit configured to output an incident light signal to be emitted to an object;

a lens unit configured to collect a reflected light signal reflected from the object;

an image sensor unit configured to generate an electric signal from the reflected light signal collected by the lens unit;

a tilting unit configured to shift an optical path of the reflected light signal; and an image control unit configured to extract a depth information of the object from a frame shifted by the tilting unit using a phase difference between the incident light signal and the reflected light signal received by the image sensor unit, wherein the lens unit is disposed on the image sensor unit, wherein the lens unit comprises an infrared (IR) filter disposed on the image sensor unit and at least one lens disposed on the IR filter, wherein the tilting unit controls a slope of the IR filter, wherein the tilting unit comprises a voice coil motor (VCM), wherein the IR filter is disposed between the image sensor unit and the VCM, wherein the VCM comprises:

a magnet holder;

a plurality of magnets disposed on the magnet holder and spaced apart from one another at predetermined intervals;

a coil holder; and a plurality of coils disposed on the coil holder and spaced apart from one another at predetermined intervals to make pairs with the plurality of magnets, wherein the IR filter comprises a glass layer and a glass layer holder configured to support the glass layer, wherein at least a portion of the glass layer holder is surrounded by the magnet holder, wherein the magnet holder comprises a plurality of magnet guides configured to accommodate the plurality of magnets, wherein the glass layer holder comprises a plurality of protrusions corresponding to the plurality of magnet guides, and wherein the plurality of protrusions are moved to be brought into contact with or spaced apart from the plurality of magnet guides according to a magnetic field generated between the plurality of coils and the plurality of magnets.

17. The camera module of claim 16, wherein the glass layer is tilted to a predetermined angle according to movement of the plurality of protrusions.

18. A camera module comprising:

a lighting unit configured to output an incident light signal to be emitted to an object;

a lens unit configured to collect a reflected light signal reflected from the object;

an image sensor unit configured to generate an electric signal from the reflected light signal collected by the lens unit, wherein the image sensor unit comprises an image sensor;

an elastic film disposed above the image sensor unit and spaced apart from the image sensor of the image sensor unit;

a tilting unit configured to shift an optical path of the reflected light signal; and an image control unit configured to extract a depth information of the object from a frame shifted by the tilting unit using a phase difference between the incident light signal and the reflected light signal received by the sensor unit, wherein the tilting unit controls a shape of the elastic film.

19. The camera module of claim 18, comprising a housing configured to accommodate the image sensor, wherein one face of the elastic film is coupled to the housing, and the other face of the elastic film is coupled to the tilting unit.

20. The camera module of claim 18, wherein the tilting unit is configured to shift the optical path of the reflected light signal at every integration time.

* * * * *